United States Patent
Kerres et al.

(10) Patent No.: US 6,590,067 B2
(45) Date of Patent: Jul. 8, 2003

(54) MODIFICATION OF POLYMERS WITH BASIC N-GROUPS AND ION EXCHANGE GROUPS IN THE LATERAL CHAIN

(75) Inventors: Jochen Kerres, Ostfildern (DE); Andreas Ullrich, Esslingen (DE); Thomas Haring, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 0 days.

(21) Appl. No.: 09/780,560

(22) Filed: Feb. 12, 2001

(65) Prior Publication Data

US 2002/0045729 A1 Apr. 18, 2002

Related U.S. Application Data

(63) Continuation-in-part of application No. PCT/EP99/05862, filed on Aug. 12, 1999.

(30) Foreign Application Priority Data

Aug. 12, 1998 (DE) .......................... 198 36 514

(51) Int. Cl.⁷ .................. C08G 75/20; C08G 16/00
(52) U.S. Cl. .................. 528/391; 528/226; 528/228; 528/230; 528/242; 528/295; 528/482; 528/486; 528/487; 528/492
(58) Field of Search ................. 528/226, 227, 528/228, 230, 295, 486, 492, 391, 482, 242, 487; 521/27

(56) References Cited

U.S. PATENT DOCUMENTS

| | | | |
|---|---|---|---|
| 4,029,582 A | 6/1977 | Ishii et al. | |
| 5,438,082 A | 8/1995 | Helmer-Metzmann et al. | |
| 5,561,202 A | 10/1996 | Helmer-Metzmann et al. | |
| 5,741,408 A | 4/1998 | Helmer-Metzmann et al. | |
| 6,214,488 B1 | 4/2001 | Helmer-Metzmann et al. | |
| 6,264,857 B1 | 7/2001 | Kreuer et al. | |

FOREIGN PATENT DOCUMENTS

| | | |
|---|---|---|
| DE | 19632285 A1 | 2/1998 |
| EP | 0337626 A1 | 10/1989 |
| EP | 0506611 A2 | 9/1992 |
| EP | 0574791 A2 A3 | 12/1993 |
| FR | 2277847 | 2/1976 |
| WO | WO 00/09588 | 2/2000 |

OTHER PUBLICATIONS

Moulay, S. and Daly, W. H., "Chemical Reactions on Redox Polymer Precursors—II. Aminomethylation and Sulfonation," *Eur. Polym. J. 33*: 525–530, Elsevier Science Ltd. (May 1997).

International Search Report for International Application No. PCT/EP99/05862, mailed Dec. 20, 1999.

Dialog File 351, WPI Accession No. 1998–131253/ 199813, Derwent WPI English Language Abstract for DE 19632285 A1 (Document AO1) (Accessed Dec. 2002).

Dialog File 351, WPI Accession No. 1993–407181/ 199351, Derwent WPI English Language Abstract for EP 0574791 (Document AP1) (Accessed Dec. 2002).

Dialog File 351, WPI Accession No. 1976–07909X/197605, Derwent WPI English Language Abstract for FR 2277847 (Document AL2) (Accessed Dec. 2002).

*Primary Examiner*—Duc Truong

(57) ABSTRACT

A method for lateral chain modification of aryl main chain polymers with aromatic ketones or aldehydes containing tertiary basic N-groups is described. The modification can be accomplished via addition of an aromatic carboxylic acid or an acid derivative containing a tertiary amine moiety to a metallized polymer. The tertiary amines on the modified polymer can be converted to quaternary amines with halogen alkanes. Modification of the aryl main chain polymers with aromatic groups containing sulphonic acid radicals is also described. The polymers formed can be crosslinked and prepared for use in a wide variety of membrane technologies including ion exchange, dialysis, reverse osmosis, nanofiltration.

72 Claims, 14 Drawing Sheets

MODIFICATION OF POLYMERS WITH BASIC N-GROUPS AND ION EXCHANGE GROUPS IN THE LATERAL CHAIN

CROSS REFERENCE TO RELATED APPLICATION

This is a continuation-in-part of international application PCT/EP99/05862, filed Aug. 12, 1999, which was not published under PCT Article 21(2) in English, the contents of which are fully incorporated by reference herein.

FIELD OF THE INVENTION

The present invention is in the field of polymers containing basic groups and ion-exchange groups. The invention relates in particular to methods for lateral chain modification of aryl main chain polymers with aromatic ketones and aldehydes containing basic nitrogen (N) groups and to the polymers made according to the methods.

RELATED ART

A) Polymers Modified with Basic N

There are still relatively few basic N-modified polymers on the market, the most important of which are mentioned below:

poly(4-vinyl pyridine), poly-2-vinyl pyridine) and copolymers.

These two polymers are commercially available, also as block copolymers with polystyrene. They are used for example as pre-stages for anion exchange membranes (Reiner, Ledjeff[1], Gudernatsch, Krumbholz[2]) or complexed with Schiff's bases containing cobalt for selective oxygen permeation[3]. The drawback with this class of polymer is the tertiary C—H-bond in the polymer main chain, which is susceptible to oxidation.

Polybenzimidazols

Polybenzimidazols are a class of polymers which have considerable chemical and mechanical stability. Many types of polybenzimidazols (fully and partly aromatic) have already been synthesised and examined[4]. However, only a few types are produced commercially, of which the most important is the polymer PBI (poly [(2,2-m-phenylene)-5,5'-bibenzimidazol) produced by Celanese under the commercial name CELAZOLE. This polymer is used, inter alia, in the form of low-flammability textiles[5] for the Fire Brigade. The drawbacks with this polymer are that it is difficult to dissolve in organic solvents and so has poor working properties. In addition, this polymer is very expensive.

Polyethylene imine

Polyethylene imine is used in organic chemistry and biochemistry as a precipitating agent for proteins[6.] The advantage of this polymer is that by virtue of its highly hydrophilic nature (1 N on 2 C), it is water soluble and therefore, in its pure form, will not form any resistant membranes. Furthermore, by virtue of its purely aliphatic structure, it is not very chemically stable.

B) Anion Exchange Polymers and Membranes

The commercial anion exchange polymers and membranes can be divided into two main categories:

anion exchange polymers which are produced by reaction of chlorinated[7] or bromomethylated[8] polymers with tertiary amines. The drawback with this reaction is the carcinogenic nature of the halomethylation reaction and the lack of chemical stability of the aromatic-$CH_2$—$NR_3$+ grouping.

anion exchange polymers produced by the alkylation of tertiary N, for example of poly(vinyl pyridine)[1,2,9] with halogen alkanes[1,2]. The disadvantage with this reaction is that only very few commercial polymers with tertiary N are available (see above) and thus the range of membrane properties to be achieved is limited. The drawback with poly(vinyl pyridine)s is limited chemical stability (see above).

C) Cation Exchange Polymers Sulphonated in the Lateral Group

There are very few commercial polymers and membranes of this type. The most important are:

nafion[10]

This polymer has a perfluoralkyl main chain and a perfluorether lateral chain at the end of which hangs a sulphonic acid group. This polymer is used in applications which require great chemical membrane stability, for example, in membrane fuel cells[11]. The disadvantage of this polymer is its high price ($800/sq.m) and complicated production process[10].

poly-X 2000[12]

This polymer consists of a poly(phenylene) main chain and an aryl lateral chain. The precise name of this polymer is poly(oxy-1,4-phenylene-carbonyl-1,4-phenylene). This polymer is sulphonated[12] only at the end of the lateral chain. Reportedly[12], this polymer in the sulphonated form has good proton conductivity levels even at temperatures in excess of 100° C. at which the proton conductivity of sulphonated poly (ether ether ketone) (PEEK) drops markedly. This property could be brought out by a better association of the sulphonic acid groups in the poly-X 2000, since the sulphonic acid groups are in the lateral chain in the case of the poly-X 2000—in the sulphonated PEEK, the sulphonic acid groups are in the main chain and consequently, on account of the rigidity of the PEEK main chain, they associate less readily. A drawback with this polymer is its poorer thermal stability compared with sulphonated PEEK[12] and the fact that it is not commercially available.

SUMMARY OF THE INVENTION

The invention is directed to:

(1) A method for the lateral chain modification of engineering aryl main chain polymers with arylene-containing basic N-groups by the addition of aromatic ketones and aldehydes containing tertiary basic N-groups (such as for example tertiary amine, pyridine, pyramidine, and triazine) to the metallized polymer.

(2) Lateral chain modified polymers obtainable by the methods of the invention, whereby the lateral chain contains at least one aromatic group which carries a tertiary basic N.

(3) A method for quaternizing the tertiary N of the modified polymers obtainable according to the invention with halogen alkanes in order thus to incorporate anion exchanger groups into the lateral chain modified polymer.

(4) Engineering aryl main chain polymers carrying in the lateral chain anion exchanger functions and obtainable by the methods of the invention.

(5) A method for the lateral chain modification of engineering main chain polymers with arylene-containing basic N groups by the following reaction of aromatic carboxylic acid Ar—COOR' containing tertiary basic N groups (such as for example tertiary amine, pyridine, pyramidine, and triazine) with the metallized polymer P—Me:

(6) Lateral chain modified polymers obtained by the methods of the invention in which the side chain contains at least one aromatic group which carries a tertiary basic N.

(7) A method of quaternizing the tertiary N of the modified polymers obtained by the methods of the invention with halogen alkanes to incorporate anion exchanger groups into the lateral chain modified polymer.

(8) Engineering aryl main chain polymers carrying in the lateral chain anion exchanger functions obtainable by the methods of the invention.

(9) A method for the lateral chain modification of engineering aryl main chain polymers with aromatic groups containing sulphonic acid radicals by the following sequence of reactions:

(9a) Reaction of the aromatic carboxylic acid ester Ar—COOR' or carboxylic acid halide Ar—COHal with the metallized polymer P—Me:

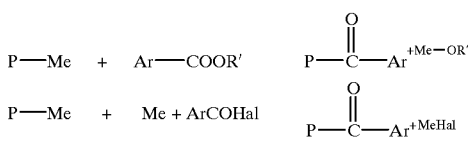

(9b) Controlled electrophilic sulphonation of the lateral group with sulphuric acid $SO_3/P(O)(OR)_3$, $ClSO_3H$, or other sulfonating reagent. The lateral group is in this case so selected that its reactivity for sulphonation is substantially higher than the reactivity of the polymer main chain for sulphonation.

(10) Engineering aryl main chain polymers which only carry sulphonic acid functions in the lateral chain, obtainable by the methods of the invention.

(11) Membranes of the polymers obtainable according to the present invention, in which the membranes may be unvulcanised or covalently cross-linked.

(12) A method of producing acid-based blends/acid-based blend membranes from the basic polymers of the invention with polymers containing sulphonic acid, phosphonic acid or carboxyl groups.

(13) A method of producing acid-based blends/acid-based blend membranes from the basic polymers of the invention with the polymer of the invention containing sulphonic acid groups.

(14) Acid-based blends/acid-based blend membranes obtainable by the methods of the invention, whereby the blends/blend membranes may in addition be covalently cross-linked.

(15) Use of the ion exchange polymers of the invention in the form of membranes in membrane processes such as in polymer electrolyte membrane fuel cells (PEFC), direct methanol fuel cells (DMFC) and electrodialysis.

(16) Use of hydrophilic polymers of the invention containing the basic N in the lateral group in the form of membranes in dialysis and in reversed osmosis, nanofiltration, diffusion dialysis, gas permeation, pervaporation and perstraction.

For many applications in membrane technology (reversal osmosis, nanofiltration, micro- and ultrafiltration, electrodialysis, diffusion dialysis, membrane electrolysis, membrane fuel cells), hydrophilic or chemically stable polymers containing ion exchange groups are needed. However, these polymers are only commercially available in limited amounts. Even today, in some cases vinyl polymers with limited chemical stability are still being employed in the above-mentioned applications. Furthermore, the range of the properties of these commercial polymers is not very great.

As a result of this invention, aryl main chain polymers and membranes which are modified with basic nitrogen in the lateral group have become available. These polymers and membranes are hydrophilic and have very good thermal and mechanical stability. Furthermore, this invention provides chemically stable cation and anion exchange membranes which additionally, by reason of the presence of the ion exchange groups in the lateral chain, display a greater degree of freedom for forming ion exchange group associates than if the ion exchange groups were present in the polymer main chain.

In particular, the invention is directed to a method for producing engineering aryl main chain polymers having aryl-containing basic N-groups having the general formula

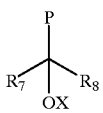

(I)

wherein P is a polymer with the repeating units $R_1$:

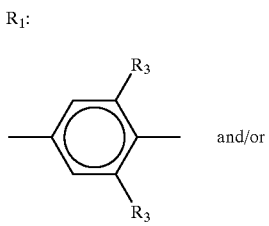 and/or $R_2$:

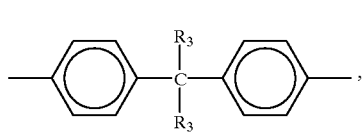, wherein $R_3$ is hydrogen, alkyl or aryl,
and said units $R_1$ and/or $R_2$ are linked by at least one group selected from $R_4$:

, $R_5$:

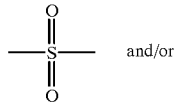 and/or $R_6$:

, $R_7$ is an aromatic group containing tertiary basic N,
$R^8$ is hydrogen, alkyl or aryl, which optionally contains tertiary basic N, X is hydrogen or an alkyl group, comprising a) reacting metallized polymer P—Me, wherein Me is Li or Na, with an aromatic ketone or aldehyde containing tertiary basic N-groups and having the general formula

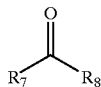
(II)

to give an intermediate product of formula:

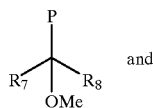
and (b) protonating with water or etherifying with an alkyl halide.

The invention is also directed to a method for producing an engineering aryl main chain polymer having aryl-containing basic N-groups, comprising reacting a metallized polymer P—Me described above with an aromatic carboxylic acid derivative having tertiary basic N-groups of formula

(III)

wherein $R_{10}$ is an aromatic group containing tertiary basic N-groups and

Y is a halogen or —O—$R_{11}$, wherein $R_{11}$ is an alkyl group or an aryl group.

The invention is also directed to a method for producing an engineering aryl main chain polymers having aryl-containing quaternary N-groups, comprising quarternizing the engineering aryl main chain polymers having aryl-containing basic N-groups with one or more halogen monoalkanes.

The invention is also directed to a method for producing engineering aryl main chain polymers having aryl-containing quaternary N-groups, comprising quarternizing and covalently cross-linking the engineering aryl main chain polymers having aryl-containing basic N-groups with a mixture of halogen mono- and halogen dialkanes The invention is also directed to a method for producing engineering aryl main chain polymers having aromatic sulphone acid groups, comprising reacting an engineering aryl main chain polymer having aryl-containing basic N-groups with a sulphonating agent.

The invention is also directed to a method for producing a polysulphone having sulphonated aromatic side chains and having the general formula (IV)

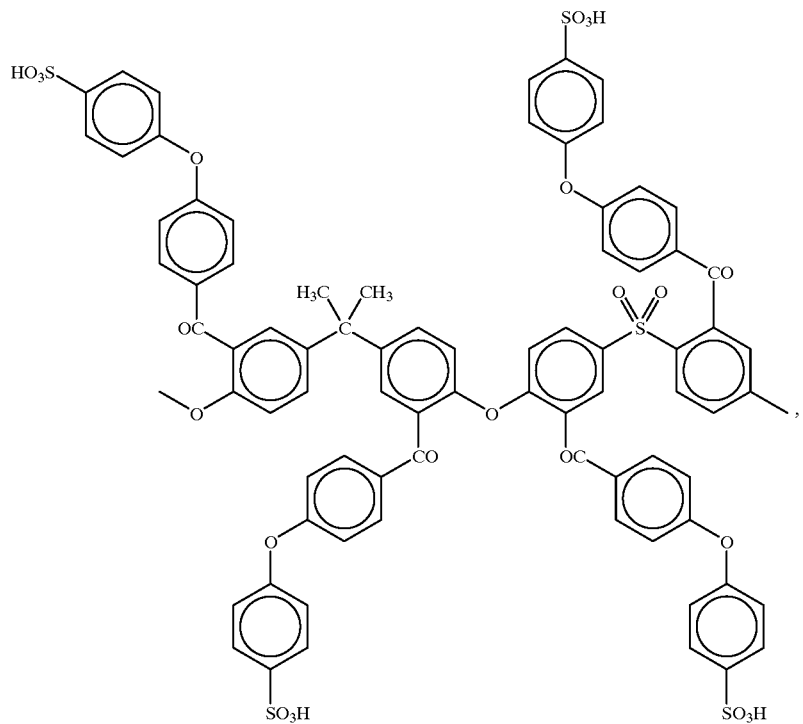

comprising metallizing polysulphone PSU Udel® with lithium to give, for example, a lithiated polymer of the formula

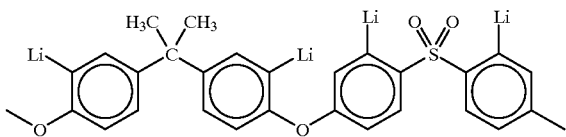

and reacting with an aromatic carboxylic acid derivative of the formula

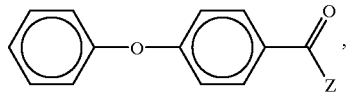

wherein Z is a halogen, and
reacting the reaction-product with sulphuric acid.

The invention is also directed to a method for producing anion exchange polymers, comprising reacting metallized polymers P—Me described above with diaromatic ketones having tertiary N-groups and then oxidizing the polymer in dilute mineral acid in solution or dispersion by the use of an oxidation agent. A particularly preferred oxidizing agent is air in an acid solution.

The invention is also directed to a method for producing polymer membranes, comprising dissolving the polymers of the invention in a dipolar aprotic solvent, applying the polymer solution to a backing as a thin layer, and removal of the solvent, e.g. by evaporation. Examples of such backings include a glass plate, a woven fabric or a fleece.

The invention is also directed to a method for producing acid-base blend membranes, comprising mixing the polymers of the invention with polymers in acid or salt form containing sulphonate, phosphonate or carboxylate groups in a dipolar aprotic solvent, applying the polymer solution to a backing as a thin layer, and removing the solvent.

The invention also relates to methods of using the membranes obtained according to the invention in membrane processes, particularly in polymer electrolyte membrane fuel cells, direct methanol fuel cells, diffusion dialysis and electrodialysis. Particular uses include dialysis, reversal osmosis, nanofiltration, gas permeation, pervaporation and perstraction.

DESCRIPTION OF THE PREFERRED EMBODIMENTS

The description of the invention is sub-divided into five parts for reasons of clarity:

a. Basic N-modified polymers obtained by an addition reaction to lithiated polymers.

b. Basic N-modified polymers obtained by a substitution reaction with lithiated polymers.

c. Anion exchange polymers and membranes.

d. Cation exchange polymers sulphonated in the lateral group.

e. Acid-based blends and acid-based blend membranes from polymers a or b with any desired sulphonated polymers or with the cation exchange polymers d.

a) Basic N-modified Polymers by Addition Reaction to Lithiated Polymers

Particular aryl main chain polymers that can be used according to the present invention include, without limitation:

polyether sulphone PSU Udel®: $R_2(R_3=CH_3)$—$R_4$—$R_1$ $(R_3=H)$—$R_5$—$R_1$—$R_4$,
polyether sulphone PES Victrex®: $R_1$—$R_5$—$R_1$—$R_4$,
polyphenyl sulphone PPhSU Radel R®: $R_1(R_3=H)$—$R_1$ $(R_3=H)$—$R_4$—$R_1(R_3=H)$—$R_5$—$R_1$—$R_4$, and
polyether ether sulphone PEES Radel A®: [$R_4$—$R_1$ $(R_3=H)$—$R_4$—$R_1(R_3=H)$—$R_5$—$R_1(R_3=H)$]$_n$—[$R_4$— $R_1(R_3=H)$—$R_5$—$R_1(R_3=H)$]$_m$, n/m=0,18.

Figure 1:
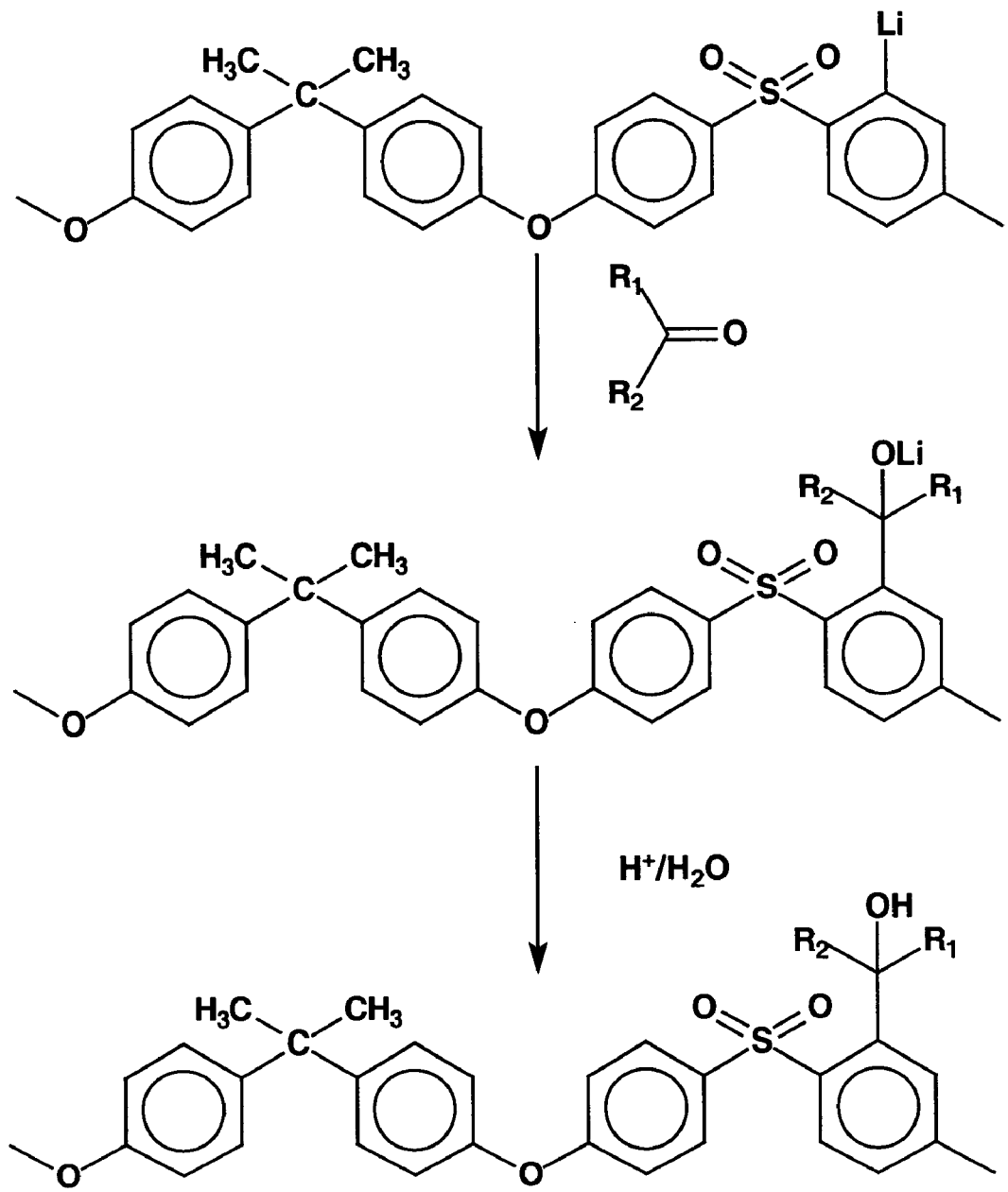
FIG. 1 depicts the reaction of lithiated PSU with benzaldehyde, benzophenone and acetone[13]. $R_1$=H, $R_2$=phenyl; benzaldehyde; $R_1$=$R_2$=phenyl: benzophenone; $R_1$=$R_2$=$CH_3$: acetone.

Guiver reports PSU hydrophilically modified in the lateral chain via a metallizing reaction and subsequent addition of selected aldehydes and ketones, forming PSU[13] modified with OH groups in the lateral chain (FIG. 1). The following degrees of substitution were achieved: benzaldehyde 1.9, benzophenone 1.0, acetone 0.5.

Figure 2:
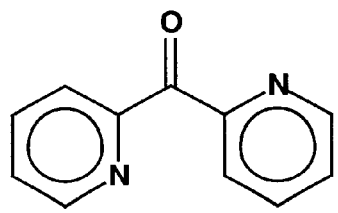
FIG. 2 depicts aldehydes and ketones which can be added to lithiated PSU after the reaction shown in FIG. 1.
Figure 2:
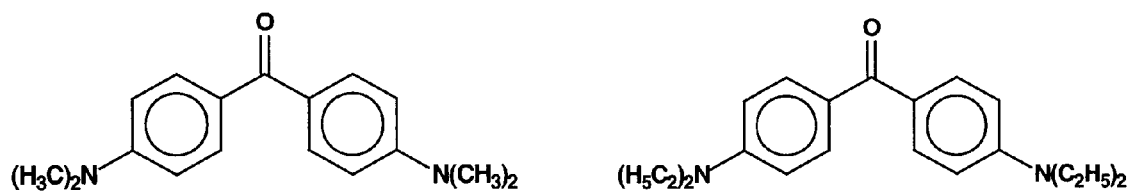
Figure 2:
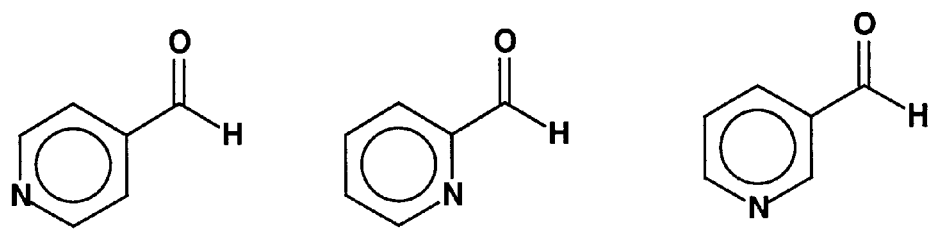
Figure 2:

Surprisingly, now, it has been found that according to the reaction in FIG. 1, aromatic ketones and aldehydes which contain tertiary N can be added to lithiated PSU. Examples of such basic aromatic ketones which can be added include (see FIG. 2) 2,2'bipyridyl ketone, 4,4'-bis(dimethyl amino)-benzophenone (Michler's ketone) and 4,4'-bis(diethyl amino)-benzophenone. Examples of basic aromatic aldehydes include (see FIG. 2) 4-dimethyl amino benzaldehyde, 4-diethyl amino benzaldehyde and pyridine-2-aldehyde, pyridine-3-aldehyde, pyridine-4-aldehyde.

Where this reaction is concerned, the degrees of substitution are dependent upon the size of the basic aromatic compound. Thus, with the stetically hindered ketones 2,2-bipyridyl ketone, 4,4'-bis(dimethyl amino)-benzophenone (Michler's ketone) and 4,4'-bis(diethyl amino)-benzophenone, degrees of substitution of about 1 are reached while degrees of substitution of up to 2 can be achieved with the above-mentioned less sterically hindered aldehydes.

Figure 3:
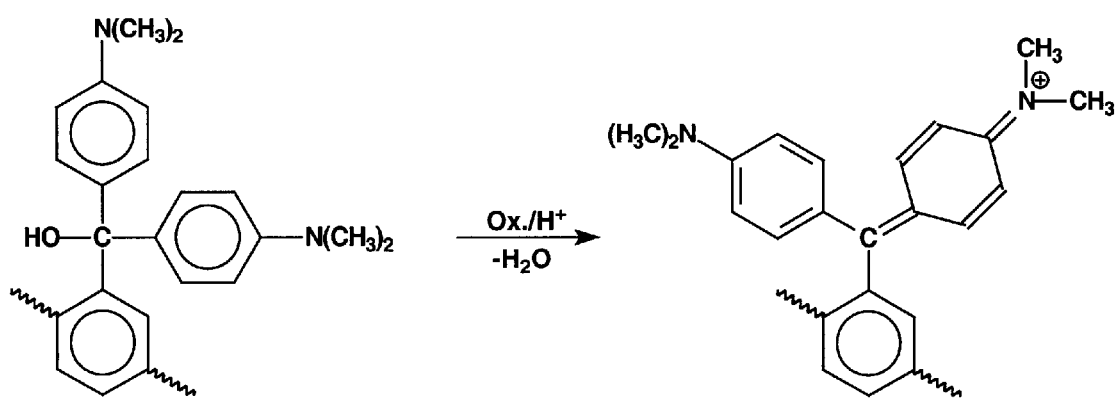
FIG. 3 depicts the presumed oxidation reaction of the adduct of 4,4'-bis-diethylamino)-benzophenone to lithiated PSU forming a chromophoric group on the PSU.

Upon synthesis of the product of addition of 4,4'-bis (diethyl amino)-benzophenone to lithiated PSU, it was surprisingly found that the substituted polymer was coloured, the colour deepening from pale green to very dark green in time, by exposure to the air. This is probably attributable to oxidation of the PSU addition product by atmospheric oxygen according to the reaction shown in FIG. 3. Presumably, a triphenyl methane dye[14] is produced. This reaction points away to chromophoric groups which can be bonded on lithiable polymers. These chromophoric groups are positively charged which means they constitute anion exchanger groupings since the compensating ions, e.g. Cl$^-$, are inter-changeable. Since the compensating ions are interchangeable, the oxidised basic polymer displays ion conductivity which it was possible to prove experimentally. Since the positive charge is distributed mesomerically over the system:

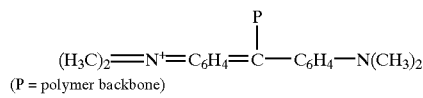

(P = polymer backbone)

These anion exchange groups are very stable in comparison with normal anion exchange groups.

Figure 4:
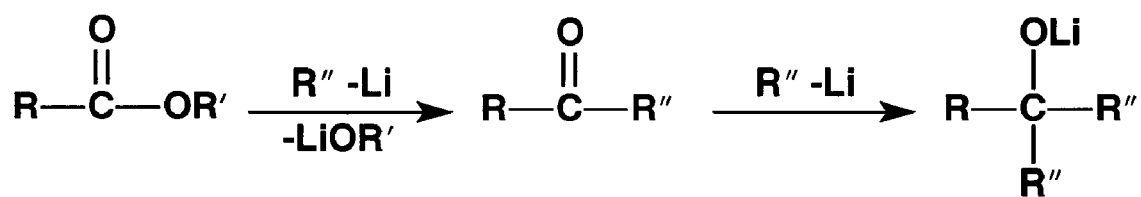
FIG. 4 depicts the normal reaction of Li organic compounds with carboxylic acid esters[16].

If it is intended to prevent oxidation of the PSU addition product, the Li-alcoholate intermediate compound which forms during the addition reaction can be captured with alkyl halides Alk-Hal, forming the ether PSU-C(C$_1$R$_2$)-OAlk. Thus, the addition compound becomes more oxidation stable than the addition compound with the free OH—group.

b) Polymers Modified by Basic N by Substitution Reaction with Lithiated Polymers If low molecular aromatic carboxylic acid esters are caused to react with Li-organic compounds, then in most cases the lithium salts of tertiary alcohols are obtained (FIG. 4)[16].

Figure 5:
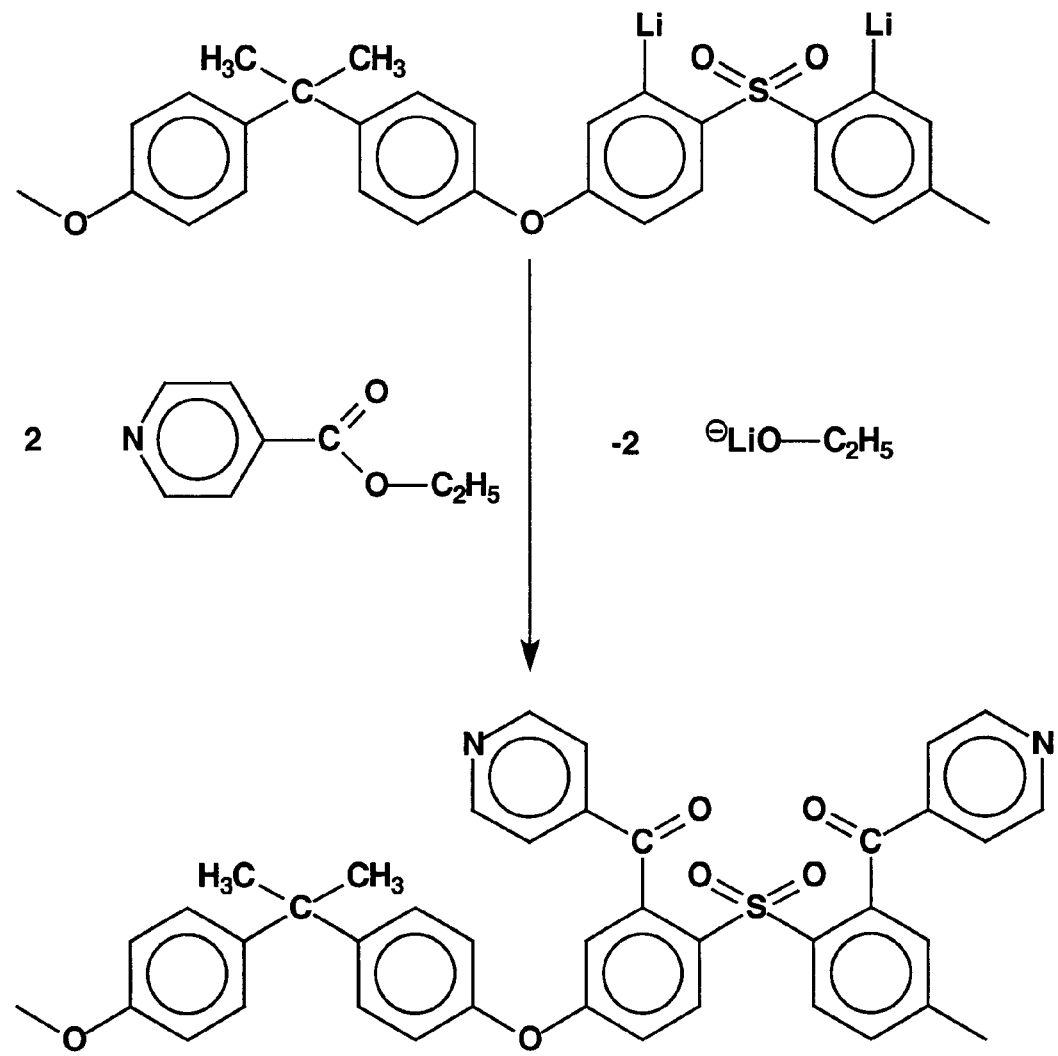
FIG. 5 depicts the reaction of lithiated PSU with isonicotinic acid ethyl ester.

Surprisingly, it has been found that the reaction of basic compounds such as for example isonicotinic acid ethyl ester and N,N-dimethyl amino benzoic acid ethyl ester with lithiated PSU can, under the selected conditions (low temperature, low polymer concentration in the solution of the lithiated PSU, excess of a basic compound) can be arrested at the ketone stage (FIG. 5).

In this way, it is possible form lithiated polymers to produce such polymers as are modified with basic N-groups (tertiary N such as pyridyl or dialkyl amino groups) in the aromatic lateral chain. By virtue of its aromatic nature and by reason of the bonding on the polymer main chain via a carbonyl function, the lateral chain becomes very oxidation stable. The synthesised polymers which contain tertiary N can, in a further step, be converted by N-quaternization into oxidation stable anion exchange polymers (see c)).

c) Anion Exchange Polymers and Membranes

The above-mentioned polymers which are modified with basic tertiary N in the aromatic lateral chain can, now, be reacted by means of conventional processes[15] to produce anion exchange polymers and membranes, whereby even anion exchange membranes are accessible by the following method: a solution of the lithiated polymer modified with tertiary-N in the lateral group is produced in a dipolar-aprotic solvent (for example, NMP, DMAc, DMF, DMSO, sulpholane, etc.). Halogen alkanes and halogen dialkanes in the desired molar ratio are then added to the solution in order to generate the desired density of cross-linking and the solvent is evaporated off at elevated temperature. During membrane formation, the tertiary-N groups are quaternized to give anion exchange groups, the dihalogen alkanes at the same time forming a covalent network in the membrane.

d) Cation Exchange Polymers which are Sulphonated in the Lateral Group

Figure 6:
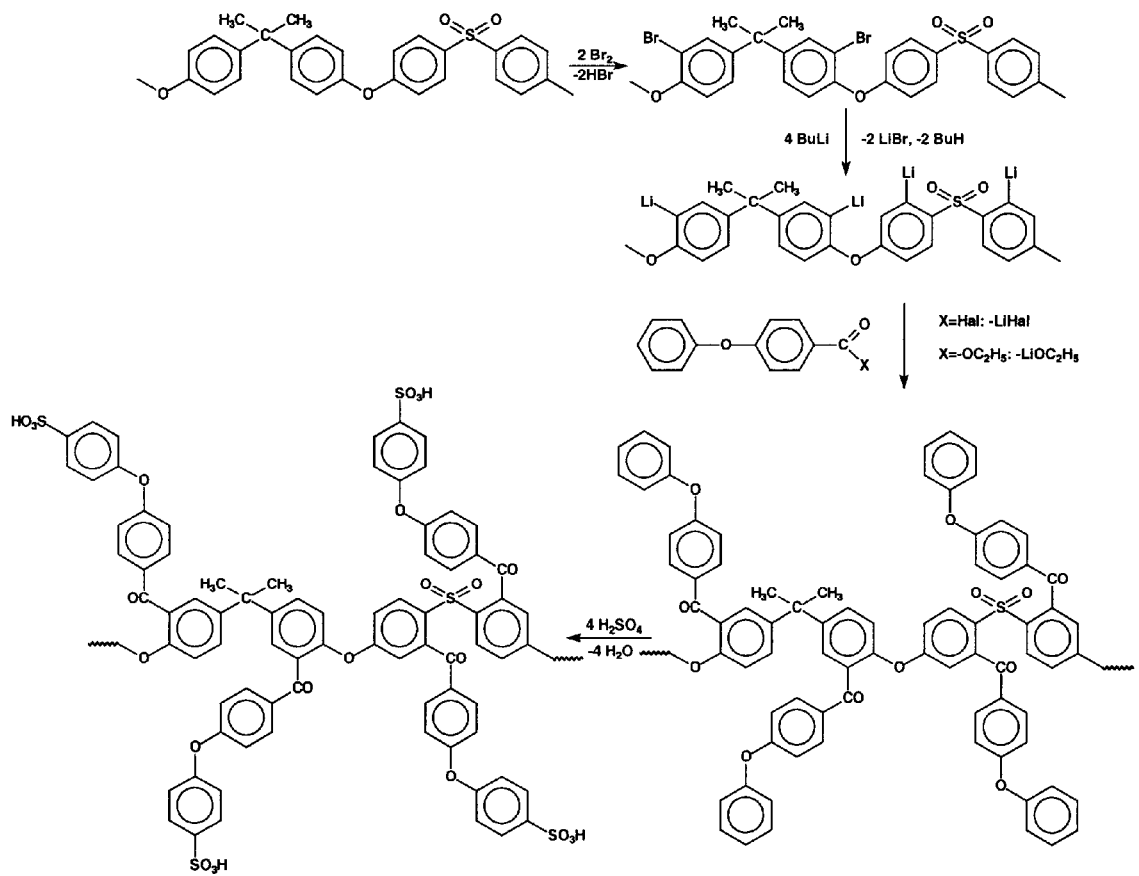
FIG. 6 depicts the sequence of reactions for obtaining polysulphone PSU Udel® sulphonated in the aromatic lateral chain.

On the basis of the reaction presented in b) (reaction of an aromatic carboxylic acid ester with lithiated aryl polymer with the bonding of an aromatic lateral group to the aryl main chain polymer via a carbonyl group), aryl main chain polymers which are sulphonated in the lateral group become accessible, subject to the aromatic lateral group being more easily electrophilically sulphonatable than the polymer main chain. In order to achieve this, the aromatic hydrocarbon present in the lateral group must have the greatest electron density of all the aromatic rings of the polymer. A reaction to obtain an aryl main chain polymer sulphonated in the aromatic lateral chain is shown in FIG. 6. In the case of the PSU Udel® sulphonated in the aromatic lateral chain, the aromatic hydrocarbon at the end of the aromatic lateral chain has the greatest electron density of the entire molecule. For this reason, this aromatic hydrocarbon is sulphonated and in fact in the p-position in relation to the ether bridge since the o-position (also electronically possible) is sterically hindered in relation to the ether bridge.

e) Acid-Based Blends and Acid-Based Blend Membranes from the Polymers a or b Polymers Sulphonated as Desired or with the Cation Exchange Polymers d The newly obtained polymers listed in sub-paragraphs a, b and d as well as any sulphonated polymers can be combined to produce new acid-based blends and acid-based blend membranes. Examples of polymers having sulfonate groups include sulfonated polystyrene, poly (anethoicsulfonic acid), sulfonated polyesters (see, e.g. U.S. Pat. Nos. 4,360,607 and 5,750,605) and polyvinylsulfate. Examples of polymers having carboxyl groups include polyacrylic acid and copolymers thereof. The location of the acid and basic groups at the end of the aromatic lateral chain provides a way to improve the association of the ion exchange groups in the blends since the position of the acid and basic groups at the end of the lateral group is less sterically hindered than if these groups were in the polymer main chain. Improved association of acid and basic groups can result in an increased local concentration of ion exchange groups in the polymer matrix and thus a higher level of proton conductivity even at relatively low concentrations of ion exchange groups compared to rigid aryl main chain polymers modified with acid and basic groups in the main chain. The morphology of the perfluorinated ion exchange polymer Nafion in which the sulphonic acid groups are strongly associated (clustered)[10] on account of the extremely hydrophobic perfluorinated backbone, can consequently be substituted by such new acid-based blends. In addition to the ionic cross-linking by the polysalt formation:

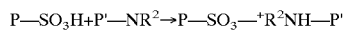

due to the mixture of acid with basic polymers in the solvent, dihalogen alkanes may be added which, during membrane formation:

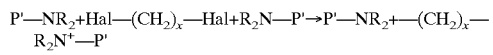

with quaternization of the tertiary N.

The invention covers new polymers and membranes which are chemically stable on account of the aromatic lateral chain and which can be further modified under control:

By quaternizing the basic N with alkyl halides, new anion exchange polymers and membranes can be produced which, by reason of the direct bonding of the basic N on the aromatic lateral chain, become chemically more stable than commercial anion exchange polymers and membranes. Due to the possibility of using dihalogen alkanes, the anion exchange polymer membranes can furthermore be covalently cross-linked at the same time.

The synthesis of polymers with aromatic lateral groups which are sulphonated in the aromatic lateral group can improve the association of the sulphonic acid groups in the polymer matrix and thus lead to higher levels of proton conductivity even at relatively low ion exchange group concentrations.

The acid-base blends and acid-base blend membranes according to the invention may display a better ion exchange group association than acid-base blends and acid-base blend membranes, in which the acid and basic groups are present in the polymer main chain, since the lateral groups are more movable than the polymer main chain. In addition to the ionic cross-linking due to the polysalt formation, these blends and blend membranes can, by covalent cross-linking, be further stabilised in terms of swelling and thus mechanical stability.

Useful aryl groups are $C_{6-14}$ aryl, especially $C_{6-10}$ aryl. Typical $C_{6-14}$ aryl groups include phenyl, naphthyl, phenanthrenyl, anthracenyl, indenyl, azulenyl, biphenyl, biphenylenyl and fluorenyl groups.

Useful halo or halogen groups include fluorine, chlorine, bromine and iodine.

Useful alkyl groups include straight-chained and branched C1–10 alkyl groups, more preferably C1–6 alkyl groups. Typical C1–10 alkyl groups include methyl, ethyl, propyl, isopropyl, butyl, sec-butyl, tert-butyl, 3-pentyl, hexyl and octyl groups.

Useful mono halogen alkyl groups include C1–10 alkyl groups substituted by a fluorine, chlorine, bromine or iodine atom, e.g. methyl iodide, ethyl bromide, 1-propyl bromide and the like. Useful dihalogen alkyl groups include C2–10 alkyl groups substituted by two fluorine, chlorine, bromine or iodine atoms, e.g. 1,2-dichloroethane, 1,3-dibromopropane, 1,4-diiodobutane and the like.

Useful tertiary amino groups include —$NR_1R_2$, wherein $R_1$ and $R_2$ are $C_{1-10}$ alkyl groups as defined above, e.g. dimethylamino, diethylamino and the like.

Useful basic N-containing hetercyclic aromatic compounds include pyrrolyl, imidazolyl, pyrazolyl, pyridyl, pyrazinyl, pyrimidinyl, pyridazinyl, indolizinyl, isoindolyl, 3H-indolyl, indolyl, indazolyl, purinyl, 4H-quinolizinyl, isoquinolyl, oxazolyl, quinolyl, phthalzinyl, naphthyridinyl, quinozalinyl, triazinyl and thiazolyl.

Having now generally described this invention, the same will be understood by reference to the following examples which are provided herein for purposes of illustration only and are not intended to be limiting unless otherwise specified.

EXAMPLES

Example 1

Reaction of N,N-Dimethyl Amino Benzaldehyde with Lithiated PSU

Figure 7:
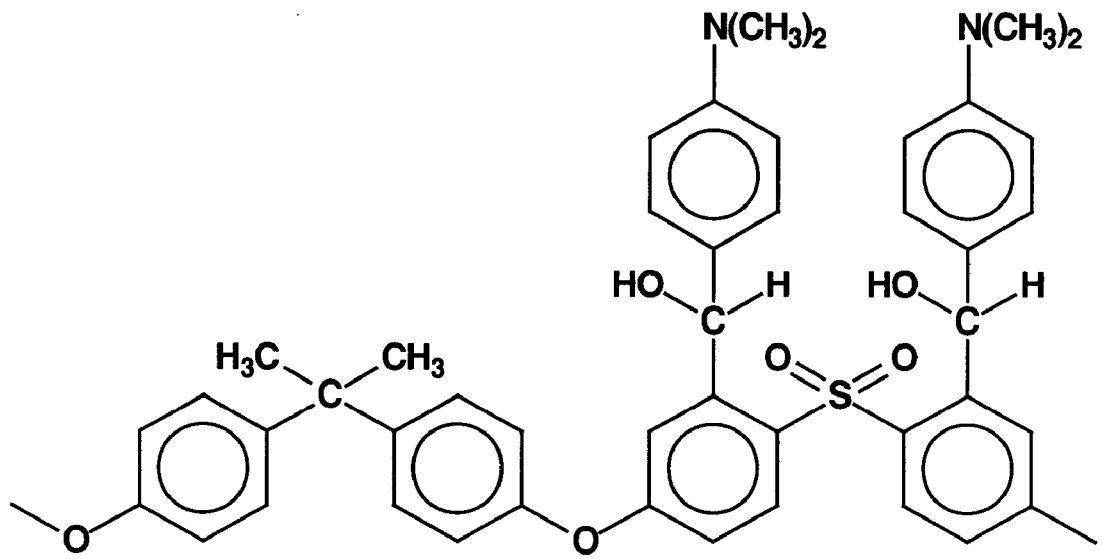
FIG. 7 depicts the reaction product of lithiated PSU with N,N-dimethyl amino benzaldehyde.

Batch:
11.05 g PSF Udel P 1800 (0.025 mol) dried
500 ml THF anhydrous
5 ml n-BuLi 10 N (0.05 mol)
10 g 4-dimethyl amino benzaldehyde (0.13 mol), dissolved in 20 ml THF Procedure
Under barrier gas, fill the THF into the reaction vessel. Afterwards, the dried polymer is introduced with argon into the reaction vessel accompanied by stirring and thorough rinsing. Once the polymer has been dissolved, it is cooled to −65° C. in a strong argon flow. The polymer solution is then titrated with n-BuLi until a slight yellow/orange coloring indicates that the reaction mixture is now anhydrous. Afterwards, the 10 N n-BuLi is injected within 10 mins. Stirring follows for 30 mins. Afterwards, the solution of 4-dimethyl amino benzaldehyde in THF is injected. Stir until such time as the reaction mixture has lost its color. Maximum waiting time at −65° C. is 1 hour. Afterwards, the acetone cold bath is taken away and replaced by an ice bath. Allow to warm to 0° C. and stir for 1 hour at 0° C. Afterwards, the reaction mixture is precipitated in 2 liters isopropanol. Dry at 50° C. firstly in a diaphragm pump vacuum then in an oil pump vacuum. Afterwards, the polymer is ground, suspended in 500 ml methanol and dried once again in a vacuum at 50° C. The chemical structural formula of the modified PSU formed is shown in FIG. 7.

Elementary analysis and the $^1$H-NMR spectrum of the polymer reveal a substitution degree of approximately 2 groups per PSU repetition unit.

Example 2

Reaction of bis(N,N-diethyl amino)benzophenone with Lithiated PSU

Batch:
11.05 g PSU Udel P 1800 (0.025 mol), dried
600 ml THF anhydrous
3 ml n-BuLi 10 N (0.03 mol)
25 g 4,4'-bis-diethyl amino benzophenone dissolved in 50 ml THF (0.077 mol)

Figure 8:
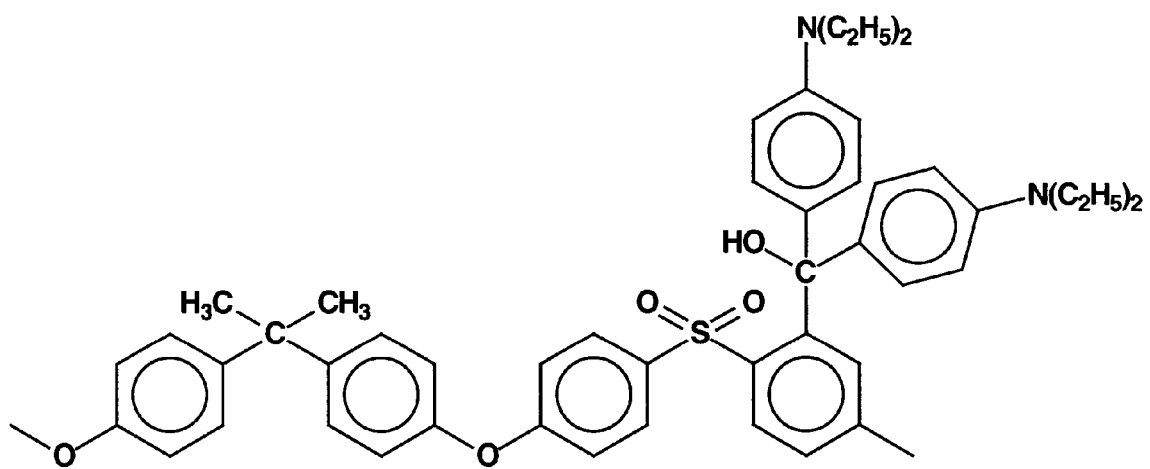
FIG. 8 depicts the reaction product of lithiated PSU with bis-(N,N-diethylamino)benzophenone.

Procedure:
Under barrier gas, fill the THF into the reaction vessel. Afterwards, the dried polymer is introduced with argon into the reaction vessel accompanied by stirring and thorough rinsing. Once the polymer has been dissolved, it is cooled to −30° C. in a strong argon flow. The polymer solution is then titrated with n-BuLi until a slight yellow/orange colouring indicates that the reaction mixture is now anhydrous. Afterwards, the 10 N n-BuLi is injected within 10 mins. Stirring follows for 50 mins. Afterwards, the solution of 44'-diethyl amino benzophenone is injected. Stir until such time as the reaction mixture has lost its colour, not more than 24 hours. Afterwards, a mixture of 20 ml isopropanol with 2 ml of water is injected into the reaction solution and afterwards warmed to room temperature. The polymer is precipitated in 2 liters of isopropanol, filtered off and washed with isopropanol. Afterwards, the polymer is stirred into 300 ml i-PrOH. Afterwards, it is filtered off again, suspended again in i-PrOH, stirred and filtered off. Afterwards, the polymer is added to 5 liters of water and stirred. After filtration, it is once again added to 5 liters of water and stirred again. Subsequently, a further filtration process follows and then washing to pH 7 and afterwards dried at 80° C. The chemical structural formula of the modified PSU formed is shown in FIG. 8.

Elementary analysis and the $^1$H-NMR spectrum of the polymer disclose a substitution degree of approximately 1 group per PSU repetition unit. The polymer is colored green, a situation which can be attributed to partial formation of triphenyl methyl chromophores by oxidation accompanied by cleavage of the OH group (see FIG. 3). If the polymer is allowed to stand at elevated temperature in dilute acid, the colour deepens to a black-green. With $^1$H— and $^{13}$C-NMR, it was possible to show that the reaction of the reaction product 6.2 shown in FIG. 3 actually takes place: the $^1$H and the $^{13}$C signal of the OH proton, of which the position could be identified by H/D exchange as being recumbent with a chemical shift of 5.8 ppm ($^1$H-NMR) or a chemical shift of 85 ppm ($^{13}$C-NMR), had almost completely disappeared after the reaction products 6.2 had been stored in dilute acid at 60° C. with air having access.

Figure 9:
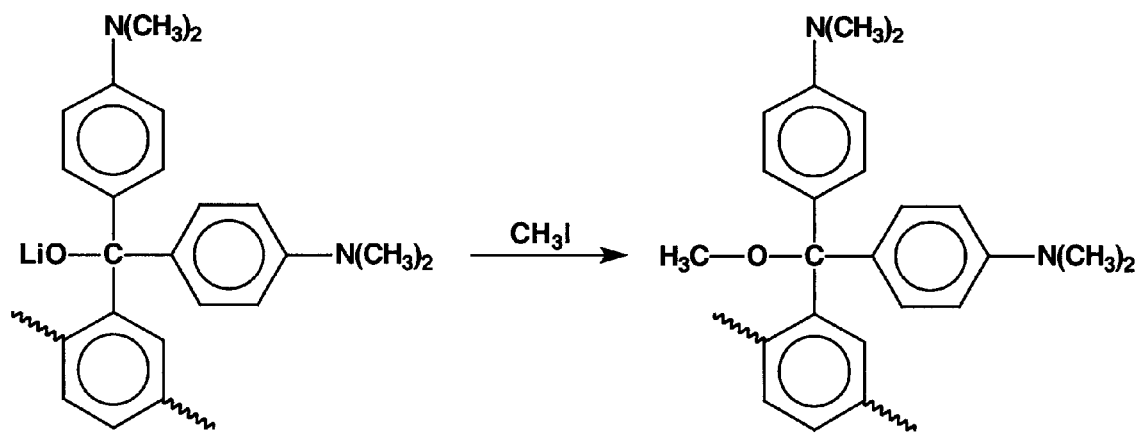
FIG. 9 depicts the etherification of the PSU Li alcoholate.

Formation of the chromophoric group can be prevented by etherifying the OH group by a reaction of the PSU-Li-alkoxide with methyl iodide for example (FIG. 9). The oxidized reaction product 6.2 displays ion conductivity which can be attributed to the causes outlined hereinabove. To this end, films of the oxidised polymer were assessed by impedance spectroscopy in 0.5 N HCl with and without secondary HCl treatment.

Results:

| Polymer film | Film thickness [μm] | $R_a$ [Ω*sq.cm] | $R_{sp}$ [Ω*cm] |
|---|---|---|---|
| 6.2 + secondary treatment | 55 | 7.6 | 500 |
| 6.2 without secondary treatment | 155 | 4.6 | 840 |

Example 3

Reaction of 2,2'-Dipyridyl Ketone with Lithiated PSU

Batch:
6.88 g PSU Udel P 1800 (0.01556 mol) dried
400 ml THF anhydrous
1.7 ml n-BuLi 10 N (0.017 mol)
3.89 g di(2-pyridyl)-ketone (0.021 mol), dissolved in 20 ml THF Procedure:

Under barrier gas, fill the THF into the reaction vessel. Afterwards, the dried polymer is introduced with argon into the reaction vessel accompanied by stirring and thorough rinsing. Once the polymer has been dissolved, it is cooled to −30° C. in a strong argon flow. The polymer solution is then titrated with n-BuLi until a slight yellow/orange colouring indicates that the reaction mixture is now anhydrous. Afterwards, the 10 N n-BuLi is injected within 10 mins. Stirring follows for 30 mins. Afterwards, the solution of di(2-pyridyl)-ketone is injected into THF.

Stir until the reaction mixture has lost its colour, at most 48 hours at −30° C.

Subsequently, inject a mixture of 10 ml isopropanol with 1 ml water into the reaction solution and allow to warm up to room temperature. Precipitate the polymer in 2 liters isopropanol, filter off and wash with isopropanol and methanol.

Figure 10:
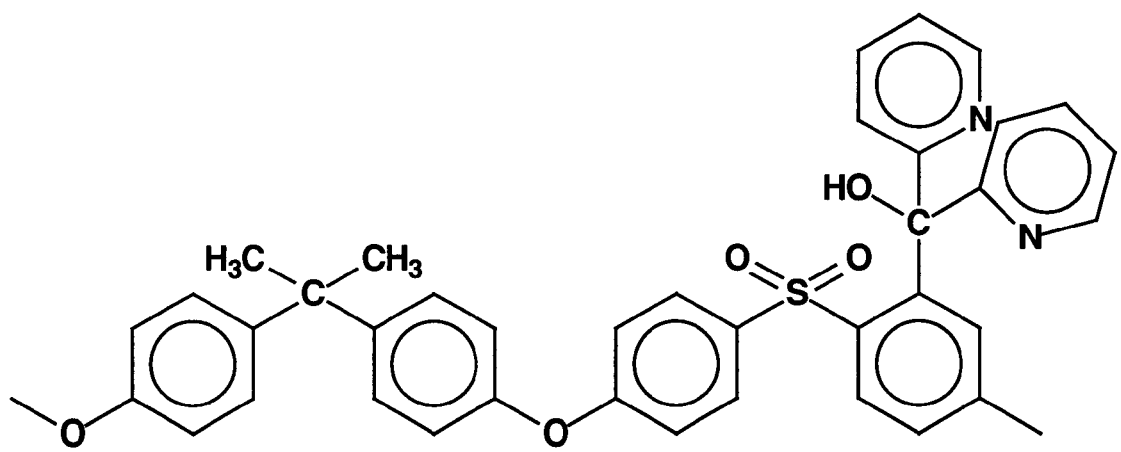
FIG. 10 depicts the structural formula of the reaction product of lithiated PSU with di(2-pyridyl)ketone.

The precipitated polymer is filtered off again, dried and stirred in 100 ml MeOH. After-wards, it is filtered off again, suspended once again in MeOH, stirred, filtered off and dried at 80° C. The structural formula of the reaction product is shown in FIG. 10.

The degree of substitution of the modified PSU in terms of dipyridyl groups, determined by elementary analysis, amounts to about 0.85 per PSU repetition unit.

Example 4

Reaction of Isonicotinic Acid Ethyl Ester with Lithiated PSU

Batch:
8.84 g PSU Udel P 1800 (0.02 mol), dried
300 ml THF anhydrous
4 ml n-BuLi 10 N (0.04 mol)
10.5 ml isonicotinic acid ethyl ester (0.07 mol)

Procedure

Figure 11:
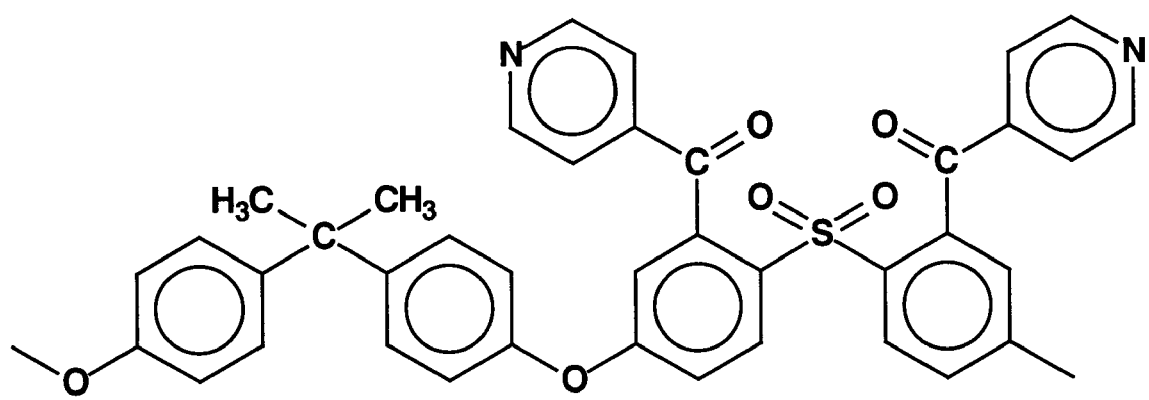
FIG. 11 depicts the product of reaction of lithiated PSU with isonicotinic aced ethyl ester.

Under barrier gas, fill the THF into the reaction vessel. Afterwards, the dried polymer is introduced with argon into the reaction vessel accompanied by stirring and thorough rinsing. Once the polymer has been dissolved, it is cooled to −30° C. in a strong argon flow. The polymer solution is then titrated with n-BuLi until a slight yellow/orange colouring indicates that the reaction mixture is now anhydrous. Afterwards, the 10 N n-BuLi is injected. Stirring follows for 50 mins. Afterwards, inject the isonicotinic acid ethyl ester and stir until the reaction mixture has lost its color, at most 24 hours at −30° C. Afterwards, inject the mixture of 20 ml isopropanol with 2 ml water into the reaction solution and allow to warm to room temperature. Precipitate the polymer in 2 ml isospropanol, filter off and wash with isopropanol. Afterwards, stir the polymer in 300 ml i-PrOH. Subsequently, filter off again, suspend once more in i-PrOH, stir and filter off. After filtration, add to 5 liters water again and stir afresh. Afterwards, filter off once more and afterwards dry at 80° C. The reaction product is shown in FIG. 11.

The degree of substitution of the modified PSU with 4-pyridyl carbonyl groups amounts to 1.65, determined by 1H-NMR and elementary analysis.

Example 5

Reaction of N,N-Dimethyl Amino Benzoic Acid Ethyl Ester with Lithiated PSU

Batch:
11.05 g PSU Udel P 1800 (0.025 mol), dried
600 ml THF anhydrous
5 ml n-BuLi 10 N (0.05 mol)
48.32 g N,N-dimethyl amino benzoic acid ethyl ester, dissolved in 100 ml THF (0.25 mol)

Figure 12:
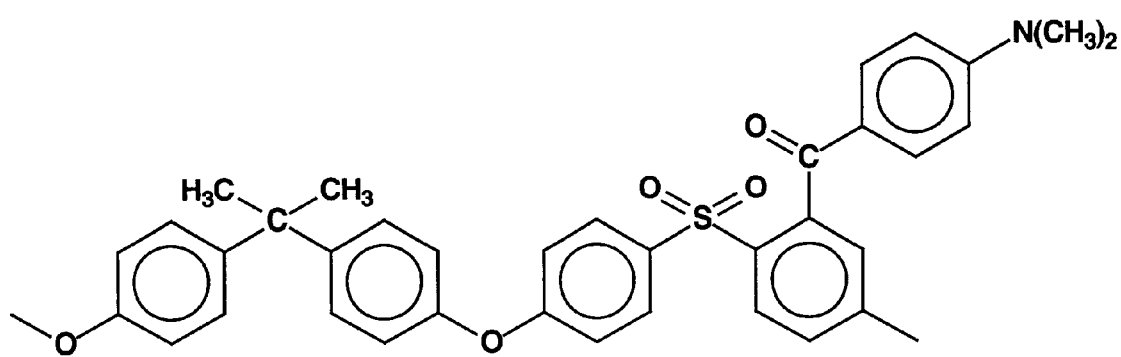
FIG. 12 depicts the product of reaction of lithiated PSU with N,N-dimethyl amino benzoic acid ethyl ester.
Figure 13:
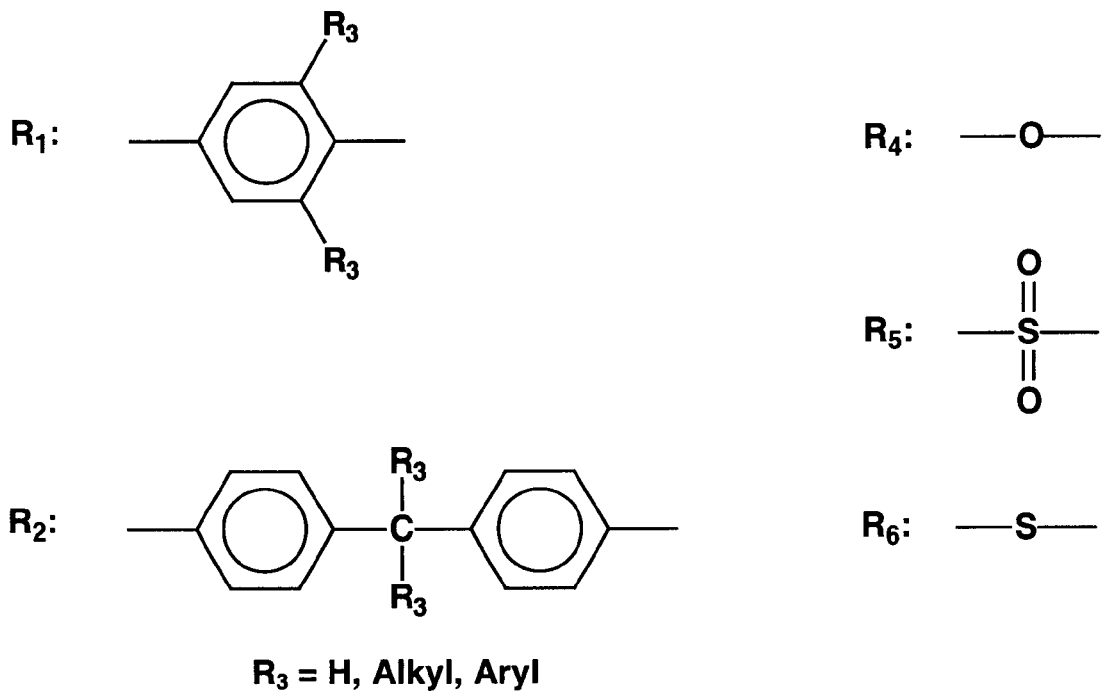
FIG. 13 depicts groups of aryl main chain polymers usable for the method according to the invention.
Figure 14:
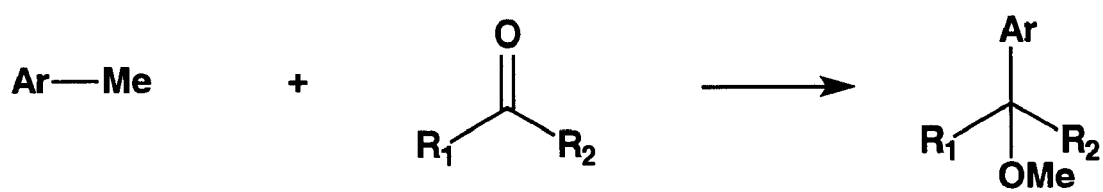
FIG. 14 depicts a reaction according to the invention and involving metallized polymers with ketones or aldehydes containing aromatic tertiary basic nitrogen (Ar=aryl main chain polymer, see FIG. 13; Me=Li, Na; $R_1$=aromatic group containing basic tertiary N; $R_2$=H or alkyl or aryl group, which may additionally contain tertiary basic N.

Procedure:

Under barrier gas, fill the THF into the reaction vessel. Afterwards, the dried polymer is introduced with argon into the reaction vessel accompanied by stirring and thorough rinsing. Once the polymer has been dissolved, it is cooled to −60° C. in a strong argon flow. The polymer solution is then titrated with n-BuLi until a slight yellow/orange coloring indicates that the reaction mixture is now anhydrous. Afterwards, the 10 N n-BuLi is injected within 10 mins. Stirring follows for 50 mins. Afterwards, the solution of N,N-dimethyl amino benzoic acid ethyl ester is injected in THF. Stir for 10 mins. Then inject the mixture of 20 ml isopropanol with 2 ml water into the reaction solution and warm up to room temperature. Precipitate the polymer in 2 liters isopropanol, filter off and wash with isopropanol and methanol. The precipitated polymer is filtered off again, dried and stirred in 100 ml MeOH. Afterwards, it is filtered off again, suspended again in MeOH, stirred, filtered off and dried at 80° C. The result of elementary analysis shows a substitution degree of 0.75 p-N,N-dimethyl amino phenyl carbonyl groups per PSU repetition unit. As further tests have shown, the degree of substitution can be increased by a longer reaction time of the lithiated PSU with N,N-dimethyl amino benzoic acid ethyl ester. The reaction product of this reaction (with a p-N,N-dimethyl amino phenyl carbonyl group per PSU repetition unit) is shown in FIG. 12.

Example 6

Acid-Base Blend Membrane of Reaction Product 6.2 with Sulphonated PSU 4 g sulphonated PSU Udel® in the SO$_3$Li form are dissolved in 25 g N-methyl pyrrolidinone. Afterwards, 1 g of the reaction product from reaction 6.2 (1.1 groups per PSU repetition unit) is added to the solution and stirred until dissolved. Afterwards, the very dark green solution is filtered off, de-gassed and applied as a thin film into a glass plate. The solution is then evaporated off at 120° C. Afterwards, the glass plate is placed in a bath with full desalinated water whereupon the polymer membrane becomes detached from the glass plate. Afterwards, the membrane is first treated in 10% sulphuric acid at 70° C. and then given a secondary treatment in completely desalinated water. Afterwards, the membrane is characterised.

Characterisation results:

| | |
|---|---|
| Ion exchange capacity: | 1.35 meq $SO_3H$/g |
| Swelling (H$^-$-form, RT): | 33.14% |
| Specific resistance (H$^+$-form, RT) | 27.6 Ωcm |

Example 7

Acid-Base Blend Membrane Consisting of Reaction Product 6.4 with Sulphonated PSU 4 g sulphonated PSU Udel® in the $SO_3Li$ form are dissolved in 25 g N-methyl pyrrolidinone. Afterwards, 1 g of the reaction product of reaction 6.2 (1.65 groups per PSU repetition unit) is added to the solution and stirred until dissolved. Afterwards, the solution is filtered, de-gassed and applied as a thin film to a glass plate. The solvent is then evaporated off at 120° C. The glass plate is then laid in a bath with fully desalinated water, whereupon the polymer membrane becomes detached from the glass plate. The membrane is then given a secondary treatment at 70° C. firstly in 10% sulphuric acid and then in fully desalinated water. The membrane is then characterised.

Characterisation results:

| | |
|---|---|
| Ion exchange capacity: | 1.09 meq $SO_3H$/g |
| Swelling (H$^+$-form, RT): | 24.6% |
| Specific resistance (H$^+$-form, RT): | 21.2 Ωcm |

Example 8

Acid-Base Blend Membrane Consisting of Reaction Product 6.5 with Sulphonated PSU 4 g sulphonated PSU Udel® in the $SO_3Li$ form are dissolved in 25 g N-methyl pyrrolidinone. Afterwards, 1 g of the reaction product from reaction 6.2 (0.75 groups per PSU repetition unit) is added to the solution and stirred until dissolved. Afterwards, the solution is filtered, de-gassed and applied as a thin film to a glass plate. Afterwards, the solvent is evaporated off at 120° C. The glass plate is then placed in a bath with fully desalinated water, whereupon the polymer membrane formed becomes detached from the glass plate. The membrane is then given a secondary treatment at 70° C. firstly in 10% sulphuric acid and then in fully desalinated water. Afterwards, the membrane is characterised.

Characterisation results:

| | |
|---|---|
| Ion exchange capacity: | 1.11 met $SO_3H$/g |
| Swelling (H$^+$-form, RT): | 23.5% |
| Specific resistance (H$^+$-form, RT): | 17.6 Ωcm |

Literature

1 Anion Exchange Membranes Consisting of Poly (vinylpyridine) and Poly(vinyl benzyl chloride) for Cr/Fe Redox Batteries A. Reiner, K. Ledjeff, Journal of Membrane Science 36: 535–540 (1988)

2 Development of an Anion-Exchange Membrane with Increased Permeability forOrganic Acids of High Molecular Weight W. Gudernatsch, Ch. Krumbholz, H. Strathmann Desalination 79: 249–260 (1990)

3 Membranes of poly(styrene-block-butadiene-block-styrene-graft-2-vinylpyridine) complexed with cobalt-containing schiff's bases for oxygen permeation G. -H. Hsiue, J. -M. Yang Die Makromolekulare Chemie (Macromolecular Chemistry) 192: 2687 2699 (1991)

4 E. -W. Chloe, D. D. Choe, Polybenzimidazoles (Overview), in: Polymeric Materials Encyclopedia, Vol. 8, 5619–5683, CRC Press, New York, 1996

5 Properties and Applications of Celanese PBI-Polybenzimidazole Fibre D. R. Coffin, G. A. Serad, H. L. Hicks, R. T. Montgomery Textile Research Journal 52(7): 466–72 (1982)

6 Polyelectrolyte precipitation of beta-galactosidase fusions containing poly-aspartic acid tails J. Zhao, C. F. Ford, C. E. Glatz, M. A. Rougvie, S. M. Gendel J. Biotechnol. 14(304): 273–83 (1990)

7 Novel Ion Exchange Membranes Based on an Aromatic Polysulfone P. Zschocke, D. Quellmalz Journal of Membrane Science 22: 325–332 (1985)

8. Polysulfon-Based Interpolymer Anion Exchange Membrame A. Warshawsky, O. Kedem Journal of Membrane Science 53: 37–44 (1990)

9 I. M. Khan, Vinylpyridine Polymers, in: Encyclopedia of Polymer Science and Engineering, Vol. 17, 567–577, Wiley-Interscience, New York, 1996

10 Perfluorinated Ion-Exchange Polymers and Their Use in Research and Industry W. G. Grot Macromolecular Symposia 82: 161–172 (1994)

11 Die reversible Membran-Brennstoffzelle (The reversible membrane fuel cell) Ledjeff, K.; Heinzel, A.; Mahlendorf, F.; Peinecke, V. Dechema Monographs, Vol. 128, VCH Verlagsgesellschaft 103–118 (1993)

12 Proton conducting polymers derived from poly (etheretherketone) and poly(4-phenoxybenzoyl-1,4-phenylene) T. Kobayashi, M. Rikukawa, K. Sanui, N. Ogata Solid State Ionics 106: 219–225 (1998)

13 Aromatic Polysulfones Containing Functional Groups by Synthesis and Chemical Modification M. D. Guiver Dissertation, Carletown University, Ottawa-Ontario, Canada (1987)

14 Beyer/Walter, Lehrbuch der Organischen Chemie (Manual of Organic Chemistry), 19th Edition, S. Hirzel Verlag Stuttgart, 569f, 1981

15 J. Goerdeler, Herstellung von quarternären Ammonium-verbindungen (Manufacture of Quaterniary Ammonium Compounds, Houben-Weyl, Methoden der organischen Chemie (Methods of Organic Chemistry), Vol. XI/2, Stickstoffverbindungen (Nitrogen Compounds) Georg Thieme Verlag, Stuttgart, S. 591 f (1958)

16 U. Schöllkopf, Methoden zur Herstellung und Umwandlung von lithium-organischen Verbindungen (Methods of Manufacturing and Converting Lithium Organic Compounds) in: Houben-Weyl, Methoden der Organischen Chemie (Methods of Organic Chemistry), Vol. XIII/1, Metallorganische Verbindungen (Metal Organic Compounds), Georg Thieme Verlag, S. 185f (1970).

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:

1. A method for producing an aryl main chain polymer having aryl-containing basic N-groups of formula

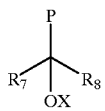 (I)

wherein P is a polymer comprising the repeating units:

$R_1$:

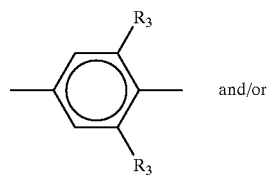 and/or $R_2$:

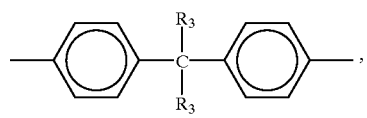, wherein $R_3$ is hydrogen, alkyl or aryl, and the units $R_1$ and/or $R_2$ are linked by at least one group selected from the group consisting of:

$R_4$:

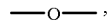, $R_5$:

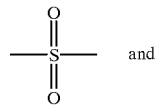 and $R_6$:

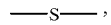, $R_7$ is an aromatic group containing tertiary basic N, $R_8$ is hydrogen, alkyl or aryl, which optionally contains tertiary basic N, X is hydrogen or an alkyl group, comprising a) reacting a metallized polymer P-Me, wherein Me is Li or Na, with one or more aromatic ketones or aldehydes containing tertiary basic N-groups having the formula

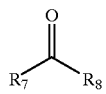 (II)

to give an intermediate product having the formula:

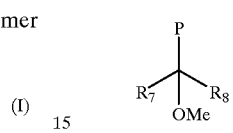

and protonating or etherifying the intermediate with water or an alkyl halide, to give the aryl main chain polymer having aryl-containing basic N-groups.

2. The method according to claim 1, wherein P—Me is a metallized polyether sulphone.

3. A method according to claim 1, wherein said aromatic ketone or aldehyde is a tertiary amine or basic N-containing heterocyclic aromatic compound.

4. The method according to claim 3, wherein said basic N-containing heterocyclic aromatic compound is pyridine, pyrimidine, triazine, imidazole, pyrazole, triazole, thiazole or oxazole.

5. The method according to claim 1, wherein said aromatic ketone or aldehyde is selected from the group consisting of:

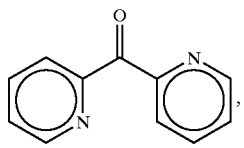,

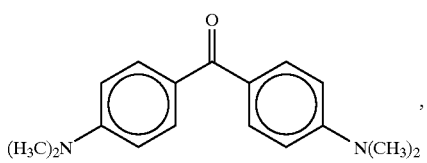,

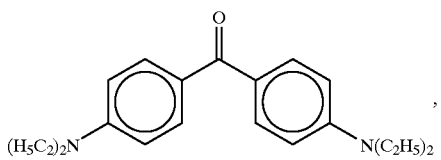,

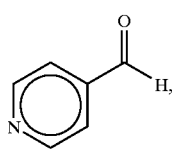 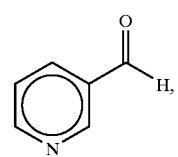

-continued

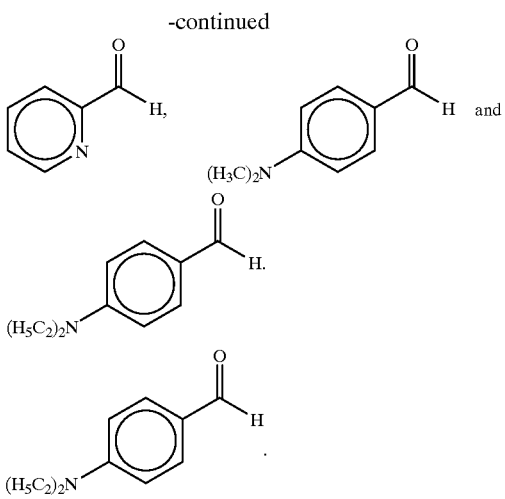

6. An aryl main chain polymer having aryl-containing basic N-groups obtained by the method according to claim 1.

7. A method for producing an aryl main chain polymer having side-chains modified with aryl-containing quaternary N-groups, comprising quaternizing the aryl main chain polymer having aryl-containing basic N-groups according to claim 6 with one or more halogen monoalkanes.

8. A method for producing an aryl main chain polymer having side-chains modified with aryl-containing quaternary N-groups, comprising quarternizing and cross-linking the aryl main chain polymer having aryl-containing basic N-groups according to claim 7 with a mixture of mono halogen alkanes and dihalogen alkanes.

9. An aryl main chain polymer having side-chains modified with aryl-containing quaternary N-groups obtained by a method according to claims 7 or 8.

10. A method for producing an aryl main chain polymer having aryl-containing basic N-groups, comprising reacting a metallized polymer P—Me with one or more aromatic carboxylic acid derivatives having tertiary basic N-groups and having the formula

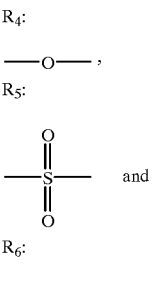

(III)

wherein $R_{10}$ is an aromatic group containing tertiary basic N-groups and Y is a halogen or —O—$R_{11}$, wherein $R_{11}$, is an alkyl group or an aryl group;

wherein P is a polymer comprising the repeating units:

$R_1$:

 and/or $R_2$:

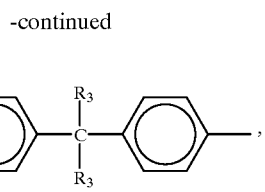

wherein $R_3$ is hydrogen, alkyl or aryl, and the units $R_1$ and/or $R_2$ are linked by at least one group selected from the group consisting of:

$R_4$:

—O—, $R_5$:

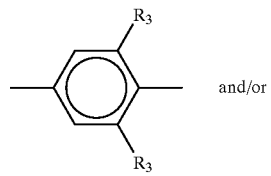 and $R_6$:

—S—, and Me is Li or Na.

11. An aryl main chain polymer having aryl-containing basic N-groups obtained by the method according to claim 10.

12. A method for producing an aryl main chain polymers having aryl-containing quaternary N-groups, comprising quarternizing the aryl main chain polymer having aryl-containing basic N-groups of claim 11 with one or more halogen monoalkanes.

13. A method for producing an aryl main chain polymer having aryl-containing quaternary N-groups, comprising quarternizing and covalently cross-linking the engineering aryl main chain polymers having aryl-containing basic N-groups of claim 11 with a mixture of one or more mono halogen alkanes and one or more dihalogen alkanes.

14. An aryl main chain polymer having aryl-containing quaternary N-groups obtained by a method according to claim 12 or 13.

15. A method for producing an aryl main chain polymer having aromatic sulphonic acid groups, comprising reacting an aryl main chain polymer having aryl-containing basic N-groups of claim 11 with a sulphonating agent.

16. The method according to claim 12, wherein said sulphonating agent is sulphuric acid, $SO_3/P(O)(OR)_3$ or $ClSO_3H$.

17. A method for producing a polysulphone having sulphonated aromatic side chains and having the formula

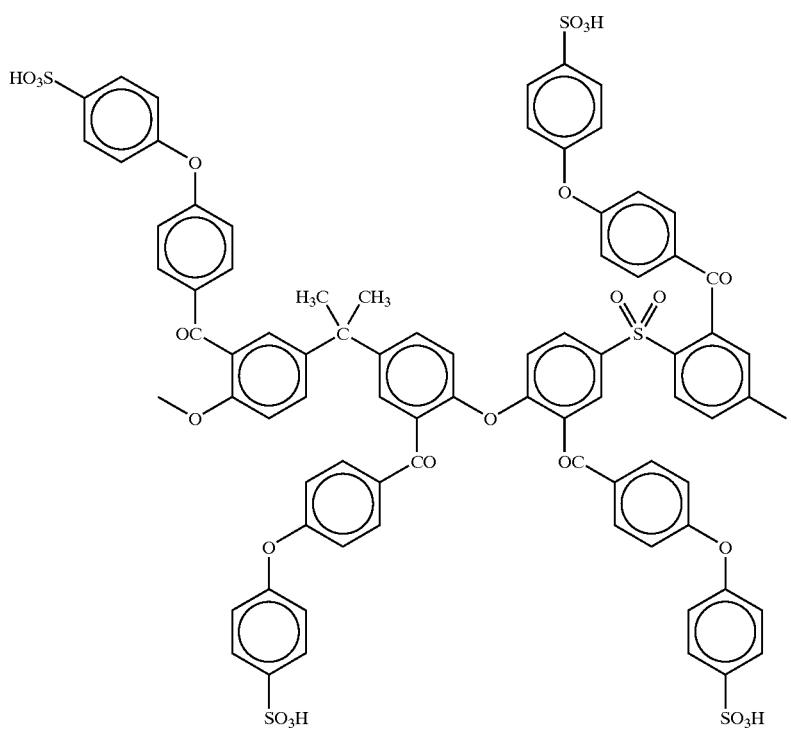

IV comprising reacting a metallized polysulphone with an aromatic carboxylic acid derivative having the formula:

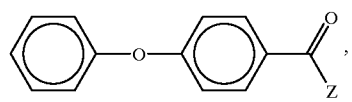

wherein Z is a halogen, and reacting the reaction-product with sulphuric acid.

18. An aryl main chain polymer having aromatic sulphonic acid groups obtained by a method according to claim 15 or 17.

19. A method for producing an anion exchange polymer, comprising reacting a metallized polymer P—Me with one or more diaromatic ketones having tertiary N-groups and then oxidizing in dilute mineral acid in solution or dispersion with an oxidizing agent.

20. The method of claim 19, wherein said oxidizing agent is air in acid solution.

21. An anion exchange polymer obtained by the method according to claim 19.

22. A method for producing a polymer membrane, comprising dissolving a polymer according to any one of claims 6, 11, or 21 in a dipolar aprotic solvent, applying the solution to a backing as a thin layer, and evaporating the solvent.

23. The method according to claim 22, wherein said backing is a glass plate, a woven fabric or a fleece.

24. An optionally covalently cross-linked polymer blend membrane obtained by a method according to claim 22.

25. A method for producing acid-base blend membrane, comprising mixing a polymer of claim 6 or 11 with an acid or salt form of a polymer containing sulphonate, phosphonate or carboxylate groups, in a dipolar aprotic solvent, applying the solution to a backing as a thin layer, and removing the solvent.

26. The method according to claim 25, wherein said polymer containing sulphonate, phosphonate or carboxylate groups has the formula:

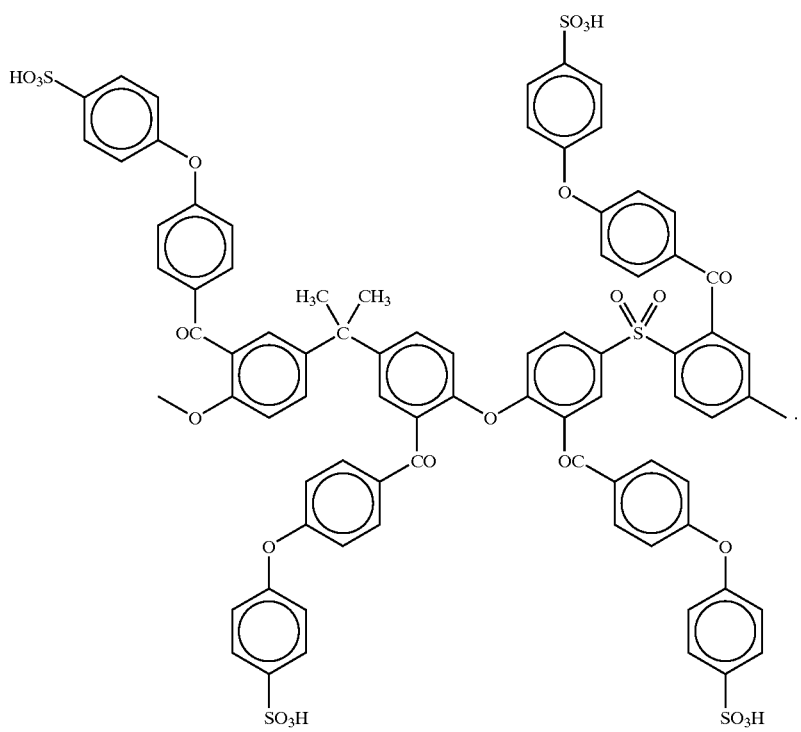
(IV)
27. The method according to claim 25, wherein said backing is a glass plate, a woven fabric or a fleece.
28. A method for producing an acid-base polymer blend membrane, comprising reacting the anion exchange polymer according to claim 21 with a polymer having the formula
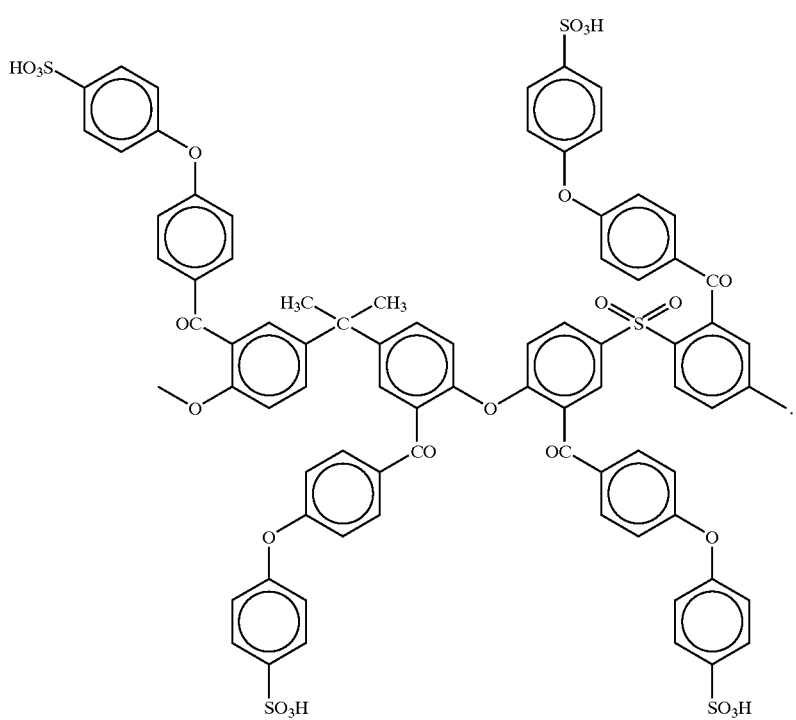
(IV)

29. An optionally covalently cross-linked acid-base polymer blend membrane obtained by a method according to claim 25.

30. An optionally covalently cross-linked acid-base polymer blend membrane obtained by a method according to claim 28.

31. A method for producing a polymer membrane, comprising dissolving a polymer according to claim 9 in a dipolar aprotic solvent, applying the solution to a backing as a thin layer, and evaporating the solvent.

32. The method according to claim 31, wherein said backing is a glass plate, a woven fabric or a fleece.

33. An optionally covalently cross-linked polymer blend membrane obtained by a method according to claim 31.

34. A method for producing a polymer membrane, comprising dissolving a polymer according to claim 14 in a dipolar aprotic solvent, applying the solution to a backing as a thin layer, and evaporating the solvent.

35. The method according to claim 34, wherein said backing is a glass plate, a woven fabric or a fleece.

36. An optionally covalently cross-linked polymer blend membrane obtained by a method according to claim 34.

37. A method for producing a polymer membrane, comprising dissolving a polymer according to claim 18, in a dipolar aprotic solvent, applying the solution to a backing as a thin layer, and evaporating the solvent.

38. The method according to claim 37, wherein said backing is a glass plate, a woven fabric or a fleece.

39. An optionally covalently cross-linked polymer blend membrane obtained by a method according to claim 37.

40. A method for producing acid-base blend membrane, comprising mixing a polymer of claim 9, with an acid or salt form of a polymer containing sulphonate, phosphonate or carboxylate groups, in a dipolar aprotic solvent, applying the solution to a backing as a thin layer, and removing the solvent.

41. The method according to claim 40, wherein said polymer containing sulphonate, phosphonate or carboxylate groups has the formula:

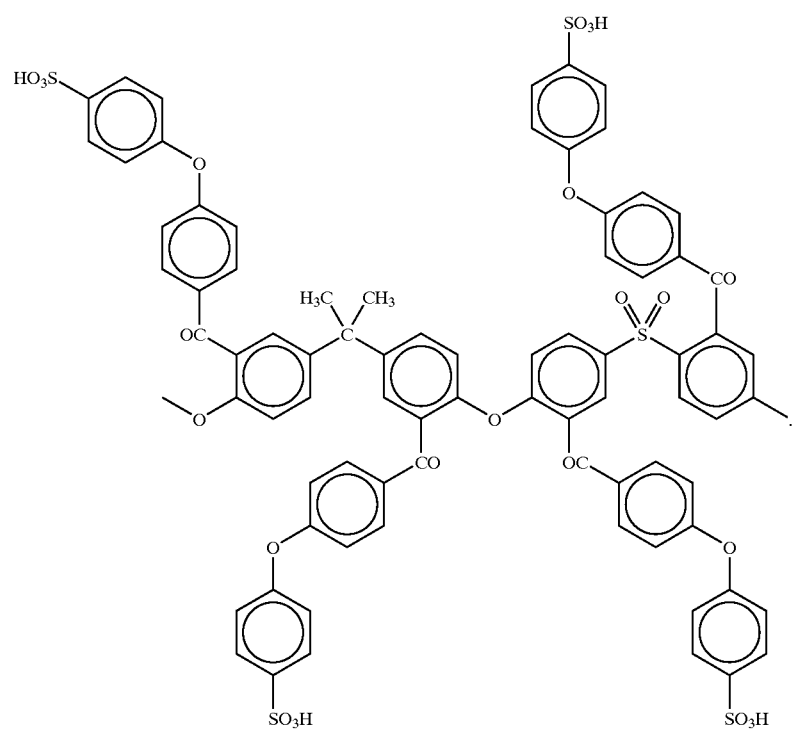

42. A method for producing acid-base blend membrane, comprising mixing a polymer of claim 14, with an acid or salt form of a polymer containing sulphonate, phosphonate or carboxylate groups, in a dipolar aprotic solvent, applying the solution to a backing as a thin layer, and removing the solvent.

43. The method according to claim 42, wherein said polymer containing sulphonate, phosphonate or carboxylate groups has the formula:

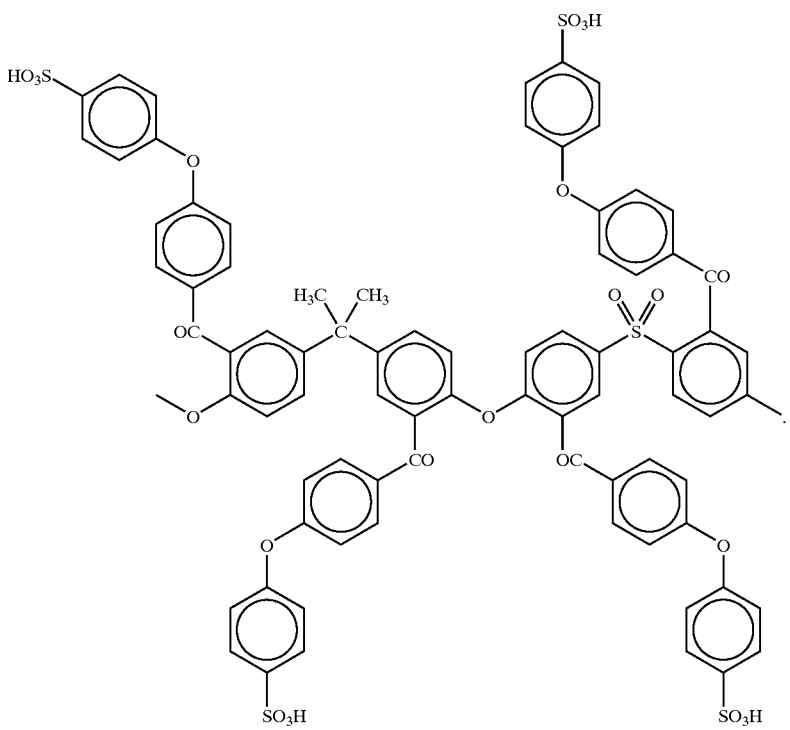

44. The method according to claim 40, wherein said backing is a glass plate, a woven fabric or a fleece.

45. The method according to claim 42, wherein said backing is a glass plate, a woven fabric or a fleece.

46. An optionally covalently cross-linked acid-base polymer blend membrane obtained by a method according to claim 40.

47. An optionally covalently cross-linked acid-base polymer blend membrane obtained by a method according to claim 42.

48. An aryl main chain polymer having aryl-containing basic N-groups of formula

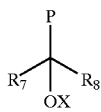

wherein
P is a polymer comprising the repeating units:

$R_1$:

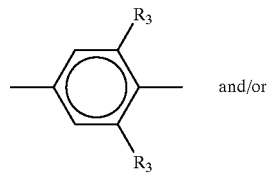 and/or

-continued $R_2$:

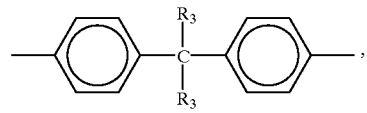

wherein $R_3$ is hydrogen, alkyl or aryl, and
the units $R_1$ and/or $R_2$ are linked by at least one group selected from the group consisting of:

$R_4$:

—O—, $R_5$:

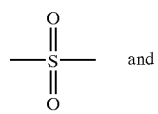 and $R_6$:

—S—;

$R_7$ is an aromatic group containing tertiary basic N;
$R_8$ is hydrogen, alkyl or aryl, which optionally contains tertiary basic N; and
X is hydrogen or an alkyl group.

49. The aryl main chain polymer having aryl-containing basic N-groups of claim 48, wherein P is a polyether sulphone.

50. The aryl main chain polymer having aryl-containing basic N-groups of claim 48, wherein P is a polyphenyl sulphone.

51. The aryl main chain polymer having aryl-containing basic N-groups of claim 48, wherein P is a polyether ether sulphone.

52. The aryl main chain polymer having aryl-containing basic N-groups of claim 48, wherein $R_7$ is a basic N-containing heterocyclic aromatic compound.

53. The aryl main chain polymer having aryl-containing basic N-groups of claim 52, wherein $R_8$ is a basic N-containing heterocyclic aromatic compound.

54. The aryl main chain polymer having aryl-containing basic N-groups of claim 52 or 53 said basic N-containing heterocyclic aromatic compound is pyridine, pyrimidine, triazine, imidazole, pyrazole, triazole, thiazole or oxazole.

55. The aryl main chain polymer having aryl-containing basic N-groups of claim 48, wherein said polymer is selected from the group consisting of:

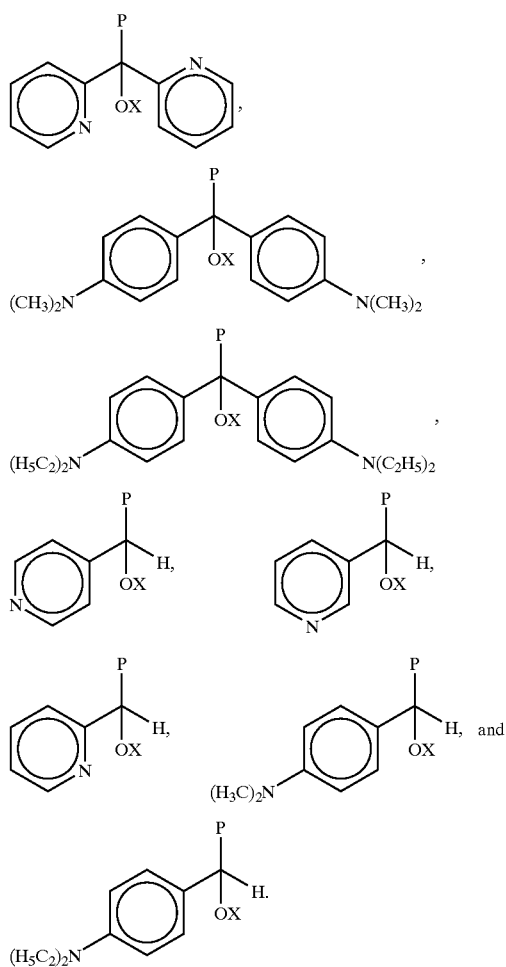

56. An aryl main chain polymer having side chains modified with aryl-containing quaternary N-groups of formula

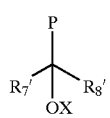

wherein
P is a polymer comprising the repeating units:

$R_1$:

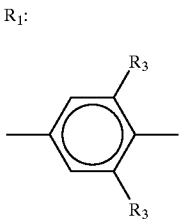 and/or $R_2$:

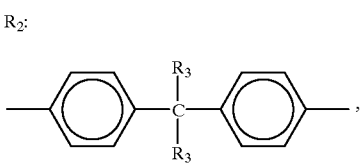

wherein $R_3$ is hydrogen, alkyl or aryl, and
the units $R_1$ and/or $R_2$ are linked by at least one group selected from the group consisting of:

$R_4$:

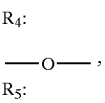

$R_5$:

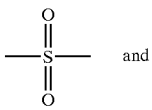 and $R_6$:

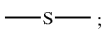 ;

$R_7$ is an aromatic group containing quaternary N;
$R_8$ is hydrogen, alkyl or aryl, which optionally contains tertiary basic N or quaternary N; and
X is hydrogen or an alkyl group.

57. The aryl main chain polymer having side chains modified with aryl-containing quaternary N-groups of claim 56, wherein two or more of said N-groups are cross-linked to each other.

58. An aryl main chain polymer having aryl-containing N-groups having the formula

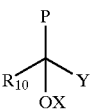

wherein $R_{10}$ is an aromatic group containing tertiary basic N-groups or quaternary N-groups and Y is a halogen or —O—$R_{11}$, wherein $R_{11}$ is an alkyl group or an aryl group; wherein P is a polymer comprising the repeating units:

$R_1$:

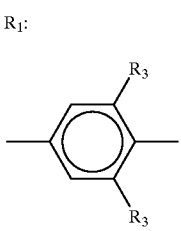 and/or

-continued

R$_2$:

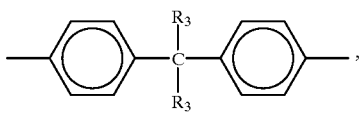

wherein R$_3$ is hydrogen, alkyl or aryl, and the units R$_1$ and/or R$_2$ are linked by at least one group selected from the group consisting of:

R$_4$:

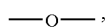

R$_5$:

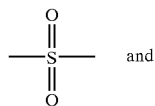 and

R$_6$:

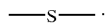

59. The aryl main chain polymer having aryl-containing N-groups of claim 58, wherein two or more of said N-groups are cross-linked to each other.

60. The aryl main chain polymer having aryl-containing N-groups of claim 58, comprising aromatic sulphonic acid groups.

61. A polysulphone having sulphonated aromatic side chains having the formula

62. An anion exchange polymer comprising the aryl main chain polymer having aryl-containing basic N-groups of claim 48, wherein R$_8$ is aryl, which optionally contains tertiary basic N.

63. An anion exchange polymer comprising the aryl main chain polymer having side chains modified with aryl-containing quaternary N-groups of claim 56, wherein R$_8$ is aryl, which optionally contains tertiary basic N or quaternary N.

64. A polymer membrane comprising the polymer according to any one of claims 48, 56, 58, 59, 60, 61, 62 or 63.

65. The polymer membrane of claim 64, further comprising a backing selected from the group consisting of a glass plate, a woven fabric and fleece.

66. An acid-base blend membrane comprising a mixture of (i) a polymer according to any one of claims 48, 56, 57, 58 or 59 and (ii) an acid or salt form of a polymer containing sulphonate, phosphonate or carboxylate groups.

67. The acid-base blend membrane of claim 66, wherein said polymer containing sulphonate, phosphonate or carboxylate groups has the formula

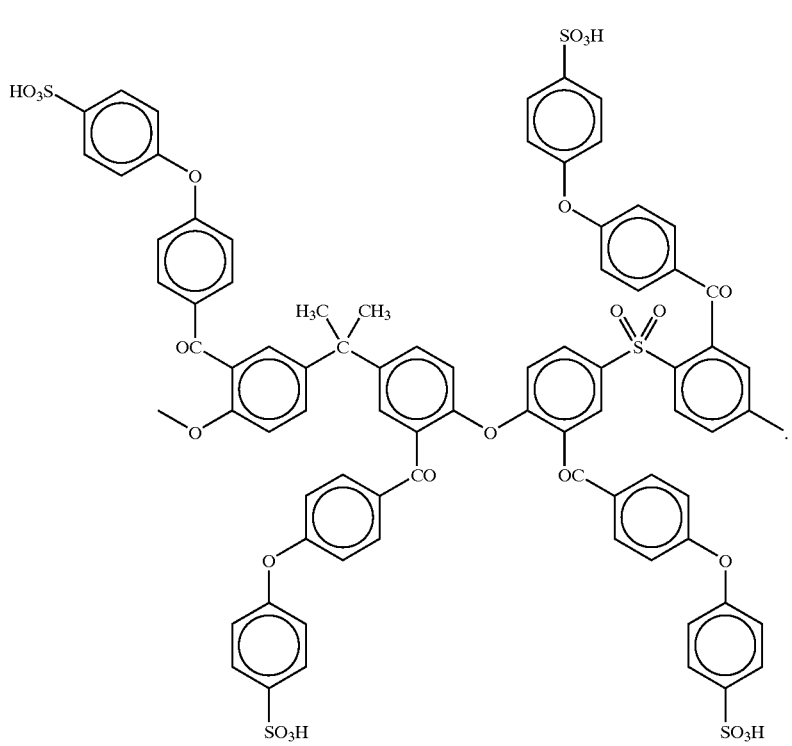

IV

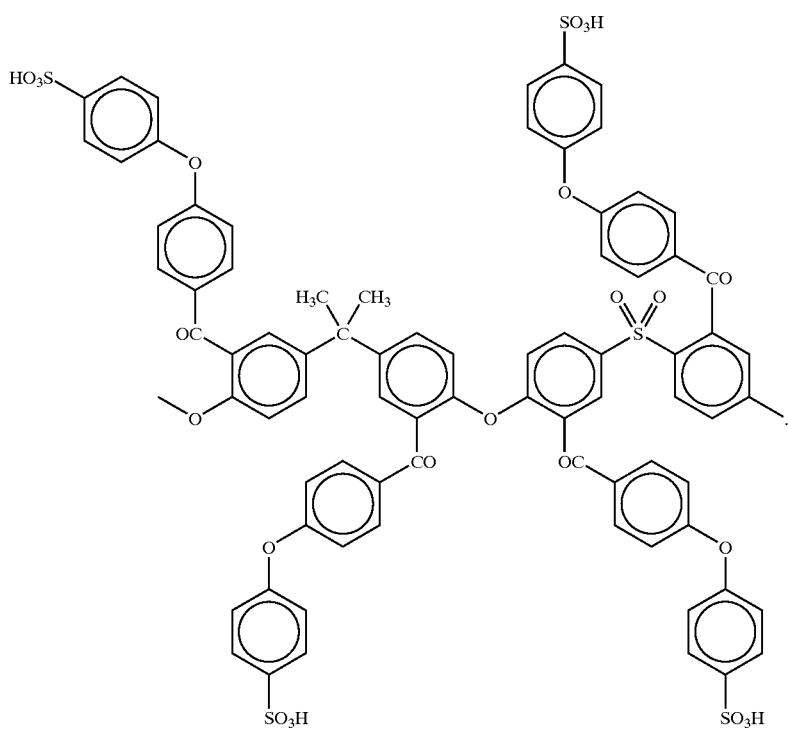
IV
68. The acid-base blend membrane of claim 66, further comprising a backing selected from the group consisting of a glass plate, a woven fabric and a fleece.
69. An acid-base blend membrane comprising a mixture of
(i) the anion exchange polymer of claim 62 or 63; and
(ii) a polymer having the formula
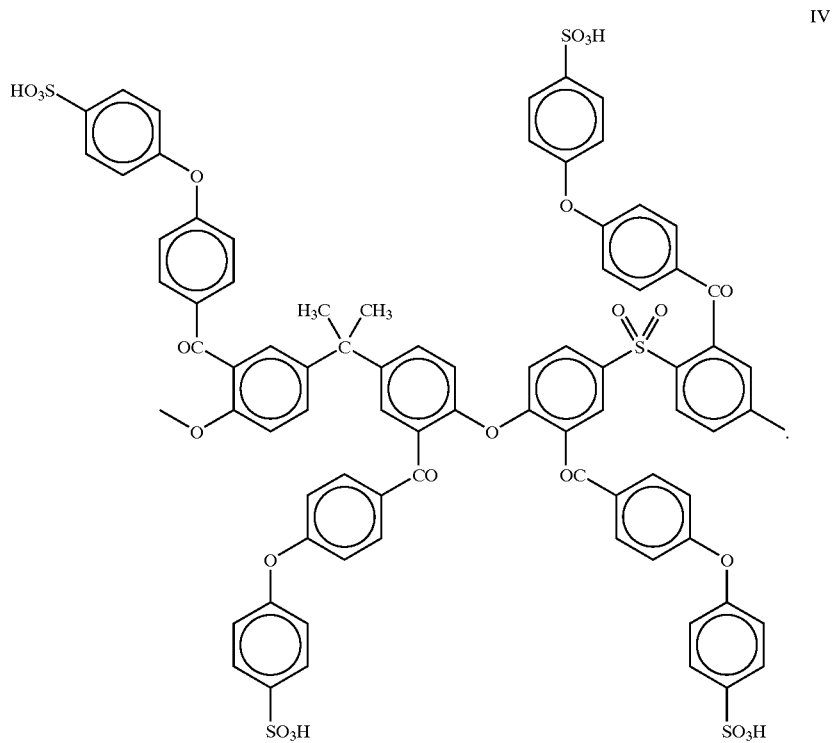
IV

70. The membrane according to claim 64, further comprising covalent cross-links.

71. The membrane according to claim 66, further comprising covalent cross-links.

72. The membrane according to claim 69, further comprising covalent cross-links.

* * * * *